US006941857B2

(12) United States Patent  (10) Patent No.: US 6,941,857 B2
McLemore                     (45) Date of Patent: Sep. 13, 2005

(54) COOKING APPARATUS

(76) Inventor: John D. McLemore, 105 Hickory Ct., Fortson, GA (US) 31906

( * ) Notice: Subject to any disclaimer, the term of this patent is extended or adjusted under 35 U.S.C. 154(b) by 0 days.

(21) Appl. No.: 10/640,691

(22) Filed: Aug. 14, 2003

(65) Prior Publication Data

US 2004/0103795 A1 Jun. 3, 2004

Related U.S. Application Data

(60) Provisional application No. 60/402,912, filed on Aug. 14, 2002.

(51) Int. Cl.[7] ................................................. A47J 37/12
(52) U.S. Cl. ............................. 99/413; 99/403; 99/407; 99/410
(58) Field of Search ........................... 99/403, 410, 411, 99/412, 413, 414, 415, 339, 340, 407

(56) References Cited

U.S. PATENT DOCUMENTS

| | | | | |
|---|---|---|---|---|
| 2,032,175 A | * | 2/1936 | Jones | 99/331 |
| 2,215,929 A | * | 9/1940 | Husk | 99/329 R |
| 2,597,695 A | * | 5/1952 | Braski et al. | 219/441 |
| 2,785,277 A | * | 3/1957 | Jepson | 219/442 |
| 4,798,939 A | * | 1/1989 | Nett | 219/438 |
| 4,968,516 A | * | 11/1990 | Thompson | 426/233 |
| 5,172,328 A | | 12/1992 | Cahlander et al. | |
| 5,379,684 A | | 1/1995 | Ettridge | |
| 5,400,700 A | * | 3/1995 | Bois | 99/403 |

(Continued)

FOREIGN PATENT DOCUMENTS

| | | |
|---|---|---|
| DE | 3 143 863 | 5/1983 |
| DE | 3 150 455 | 6/1983 |
| DE | 3 221 433 | 12/1983 |
| EP | 0 143 885 | 6/1985 |
| EP | 0 432 370 | 6/1991 |

OTHER PUBLICATIONS

DeLonghi America Inc.—Company Profile, Research, News, Information, Contact . . . , pulled from the internet at http://goliath.ecnext.com/coms2/product–compint–0000232441–page.html on Feb. 1, 2005 (1 page).

Chef's® The Best Kitchens Start Here, pulled from the internet at http://www.chefscatalog.com/store/catalog/catB9a.jhtml?itemld=cat000038&p . . . on Feb. 1, 2005 (1 page).

Delonghi DeLonghi Dual Zone Deep Fryer at sears.com, pulled from the internet at http://www.sears.com/sr/javasr/product.do?vertical=GIFT&pid=08035042000 . . . on Feb. 1, 2005 (1 page).

(Continued)

*Primary Examiner*—Reginald L. Alexander
(74) *Attorney, Agent, or Firm*—Smith, Gambrell & Russell

(57) ABSTRACT

A domestic fryer assembly and method of using which includes interconnected shell and cooking pot with the shell having an interior cavity receiving the cooking pot. A heating unit as in a resistance bar heater unit is supported by the combination shell and cooking pot and extends down into the cooking pot and features a generally horizontal portion suspended above the cooking pot bottom and preferably having a configuration of a horse-shoe with outer curved sides that generally follow the curvature of the supporting pot. The cooking pot is designed to hold sufficient cooking fluid to provide for deep frying relatively large single item food pieces as in a whole turkey of, for example, 8 to 18 pounds. The food item is preferably retained in a cooking basket that is dimensioned for insertion into the cooking pot. The cooking pot also preferably includes one or more volume reduction step-ins such as a bottom or lower one for doubling as a cooking basket support and/or an upper annular ledge step-in in the pot.

32 Claims, 21 Drawing Sheets

U.S. PATENT DOCUMENTS

| | | | |
|---|---|---|---|
| 5,429,039 | A | 7/1995 | Chang |
| D365,723 | S | 1/1996 | Powell |
| D378,647 | S | 4/1997 | Piret |
| 5,651,905 | A | 7/1997 | Thies et al. |
| 5,718,934 | A | 2/1998 | Hayakawa |
| 5,758,569 | A | 6/1998 | Barbour |
| 5,794,522 | A | 8/1998 | Bois et al. |
| 5,896,810 | A | 4/1999 | Barbour |
| 5,973,297 | A | 10/1999 | Winter et al. |
| 6,002,111 | A | 12/1999 | Beugnot et al. |
| 6,006,658 | A | 12/1999 | Siu |
| D424,366 | S | 5/2000 | Blaise |
| D431,150 | S | 9/2000 | Kalina et al. |
| 6,138,552 | A | 10/2000 | Baillieul et al. |
| 6,240,835 | B1 | 6/2001 | Bois et al. |
| D444,666 | S | 7/2001 | Kalina et al. |
| 6,262,398 | B1 | 7/2001 | Busquets et al. |
| 6,269,737 | B1 | 8/2001 | Rigney et al. |
| 6,289,793 | B1 | 9/2001 | Hu et al. |
| 6,314,869 | B1 | 11/2001 | Bourgeois, Jr. |
| 6,320,166 | B1 | 11/2001 | Park |
| D458,507 | S | 6/2002 | Meelen |
| 6,412,401 | B1 | 7/2002 | Mariotti |
| 6,443,051 | B1 | 9/2002 | Suzuki |
| 6,446,545 | B2 * | 9/2002 | Rigney .................. 99/339 |
| D464,526 | S | 10/2002 | Brown |
| 6,470,794 | B2 | 10/2002 | Takahashi |
| 6,483,990 | B1 | 11/2002 | Bikhovsky |
| 6,495,808 | B1 | 12/2002 | Clayton et al. |
| 6,498,323 | B1 | 12/2002 | Robertson, Jr. et al. |
| 6,498,326 | B1 | 12/2002 | Knappe |
| 6,515,262 | B1 | 2/2003 | Li |
| 6,532,865 | B1 | 3/2003 | Hoffman |
| 2002/0017201 | A1 | 2/2002 | Backus et al. |
| 2003/0003209 | A1 | 1/2003 | Rigney |

OTHER PUBLICATIONS

Dual Zone Deep Fryer (3.0 lb. Capacity: Model D455DZ), pulled from the internet at http://www.delonghi.com/delonghi/data/int/usa/Pordotti.nsf/b912ead30a9700c . . . on Feb. 1, 2005, (2 pages).

Chef's Dual–Zone Digital Fryer, pulled from the internet at http://www.chefscatalog.com/store/catalog/prod.jhtml?itemid=cprod6770003& . . . on Feb. 1, 2005 (1 page).

DeLonghi D882UX Cool Touch Roto Deep Fryer Review at Epinions.com, pulled from the internet at http://www.epinions.com/content_95457218180 on Feb. 1, 2005 (3 pages).

"Krups—Fryer * Friteuse * Freidora". pulled from internet at www.krups.com, Assumed Date is Jun. 2002 from 06–02 code on front cover.

Provantage, "AC Power Universal Extension Cables" pulled from internet at http://www.provantge.com/buy–22044530–belkin–cables–ac–drives–audio–monitor–printer–. . . on Aug. 14, 2003, 3 pages.

T–FAL US—Magiclean "T–FAL", pulled from internet at . . . /index.asp?category%5Fid=200&dept%5FID=210&sku=U00210&mscssid=W8V8LA5D9U0 on Mar. 24, 2003, one page.

42 Qt Turkey Deep Fryer Special "Iron Works Quality Cookware and seasonings", pulled from internet at http://www.gasgrill–store.com/42qtturdeepf.html, on Mar. 27, 2003, one page.

Krups Pro–Fry Semi Professional Stainless Steel Fryer<BR><i . . . /freeshipicon.gif border=0, "Everythinghome", pulled from internet at http://store.yahoo.com/everythingbagel/krupprofsemp.html, on Mar. 27, 2003, 3 pages.

MC Sports—King Kooker 26 Quart Aluminum Turkey Fryer/Boiling Pot, pulled from internet at http://www.mc-sports.com/product/index.jsp?productID=7599, on Mar. 27, 2003, 2 pages.

Welcome to BBQ's Galore—The World's Largest BBQ Retailer, "Barbeques Galore", pulled from internet at http://www.bbqgalore–online.com/bbq2001/shoponline/produ . . . /GrillDetails.asp?sku=26315, on Mar. 27, 2003, 2 pages.

Masterbuilt 30 qt. Aluminum Fryer, The Grand Slam at sears.com, "Masterbuilt 30 qt. Aluminum Fryer, The Grand Slam", pulled from internet at . . . /productsummary.jsp?BV_SessionID=@@@@0457175868.1048779615@@@@&BV_Eng, on Mar. 27, 2003, 1 page.

Amazon.com: Home & Garden/Outdoor Living/Categori . . . /Turkey Fryers & Fish Cooker, pulled from internet at http://www.amazon.com/exec/opidos/tg/browse/–/553776/102–0365240–8744926, on Dec. 17, 2003, 4 pages.

* cited by examiner

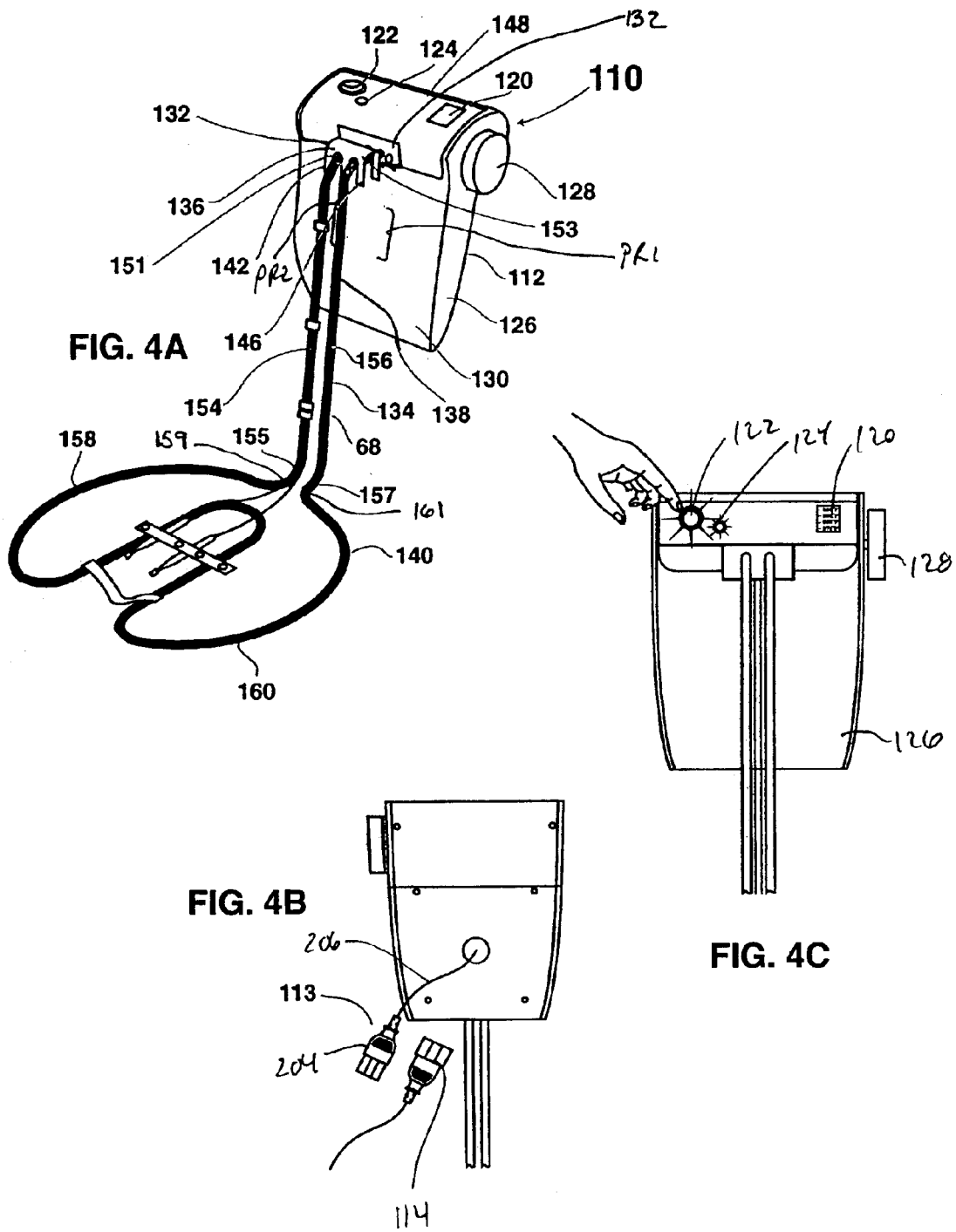

COOKING APPARATUS

CROSS REFERENCE TO RELATED APPLICATIONS

The present application claims priority under 35 U.S.C § 119(e) to U.S. Provisional Appln. No. 60/402,912, filed Aug. 14, 2002 and entitled Cooking Apparatus, which application is incorporate herein by reference

FIELD OF THE INVENTION

The present invention features a cooking apparatus with a preferred embodiment being a domestic indoor electric power sourced fryer that is well suited for deep frying large food objects such as a turkey.

BACKGROUND OF THE INVENTION

Outdoor deep frying of turkeys has gained in popularity with the advent of outdoor cooking apparatus such as the Grand Slam Turkey Fryer™ of Masterbuilt Mfg. Inc. in Columbus, Ga. which includes an outdoor propane burner, large cooking pot (e.g., 30 quarts) a cooking basket (or other means for manipulating large food items as in a turkey) and a grab handle. A cooking apparatus of this type provides for deep frying large food items with turkeys (e.g., 8 to 18 lbs in weight) being illustrative. However, weather conditions or the lack of a suitable location (e.g., apartment dwellers) can prevent or lessen the desire to use an outdoor cooking apparatus.

As illustrated by U.S. Pat. Nos. 6,138,552 and 6,002,111 there also exist indoor, home use or domestic electric fryers. These devices, however, are designed for frying small, multiple individual food items in groups as in fries, onion rings, and vegetables.

SUMMARY OF THE PRESENT INVENTION

The present invention features a non-outdoor, preferably electric power sourced fryer such as a non-commercial or domestic "house use" sized electric fryer that can accommodate large single piece food items such as turkeys (e.g., 8 to 18 lb turkeys or turkeys in the more common 10 to 14 lb range). Also, in a preferred embodiment, while being able to handle items such as 8 to 18 lb turkeys, there is maintained a low volume cooking fluid (e.g., 6 to 16 quarts) in a first embodiment and 8 to 12 in even further reduced cooking fluid volume alternate embodiments with a 10 quart "fill line" demarcation being preferred. The present invention thus provides a means for domestic home owners to enjoy deep fried large food items such as a turkey in an electric fryer positioned on a countertop, tabletop or the like.

The present invention thus features a domestic fryer assembly, comprising: a shell having an interior cavity, a cooking pot dimensioned for receipt within said interior cavity, and a heat source positioned for heating a cooking fluid within said pot; and with the pot being dimensioned to receive in cooking position a 12 pound turkey.

The cooking pot preferably includes a radial step-in section that is positioned in a lower third of said cooking pot, and the source is preferably a resistance bar having a first section that extends down into the pot and a second section that is suspended above a bottom surface of said cooking pot. The assembly of the present invention further features an embodiment with step-in section positioned above the second section of said resistance bar. The assembly also preferably features step-in section of the cooking pot includes a plurality of step-in segments spaced peripherally about the side wall of said cooking pot.

The assembly further comprises food holding means having a radial outer region dimension for support by said step-in section of said cooking pot such as a basket having cooking fluid flow through apertures and grasping means, and with the basket dimensioned for receiving a 12 or 14 pound turkey, for example. The means for supporting the food holding means in a suspended state above a portion of said heat source preferably extends along a bottom surface of said cooking pot, as in a lowered positioned fist step-in section formed in the lower end of the cooking pot. There is also preferably features a second radial step-in portion and said second radial step-in portion is positioned above said first radial step-in portion and is radial outward of said first step-in portion.

The heat source preferably includes a resistance heater bar that includes a portion extending down into said cooking pot and wherein said food holding means is dimensioned for receipt within said cooking pot and includes a recessed portion that extends in common with the downwardly extending portion of the resistance heater bar. The cooking pot also is shown to include a cooking fluid fill line representing a cooking fluid volume from 8 to 16 quarts, and with cooking pot having an overall volume of about 2 to 3 times that represented by the fluid fill line.

The assembly of the present invention also preferably includes a shell that has receiving means for receiving said cooking pot to preclude free relative rotation such as a notch formed in an upper edge of said shell that is dimensioned to receive a tab portion of said shell. An alternate embodiment features for the receiving means includes a connection block designed to connect with a corresponding connection block fixed to said cooking pot.

The shell is preferably a multi-component unit with a first component including an upper annular rim of plastic, and intermediate metallic shell wall and a lower base support with suspension projections extending thereof.

An embodiment of the invention features a domestic fryer assembly, comprising:

a shell having an interior cavity;a cooking pot dimensioned for receipt within said interior cavity; a heat source positioned for heating a cooking fluid within said pot; and said pot comprising step-in means formed in a lower half of said pot. The assembly also preferably features a heat source that includes a heater bar with a generally horizontal portion positioned below an upper surface of said step-in means. A turkey basket dimensioned for receiving turkeys of 8 to 18 pounds has a configuration which comes in supporting contact with said step in means. Also, the cooking pot has an upper annular flange which is in supporting relationship with said shell.

The present invention also features a method of deep frying a turkey with a domestic fryer, comprising:inserting a turkey into a cooking pot; and heating fluid in said cooking pot with an electric heater unit in contact with the fluid in the cooking pot.

BRIEF DESCRIPTION OF THE DRAWINGS

FIG. 4A shows the heater unit by itself.

FIG. 4B shows a cut-away rear view of the heater unit with the cord plug means shown FIG. 4C shows an enlarged, cut-away front view of the heater unit.

FIG. 19 shows a liner block interconnection between the shell and cooking pot as an alternate to

DETAILED DESCRIPTION

Figure 1:
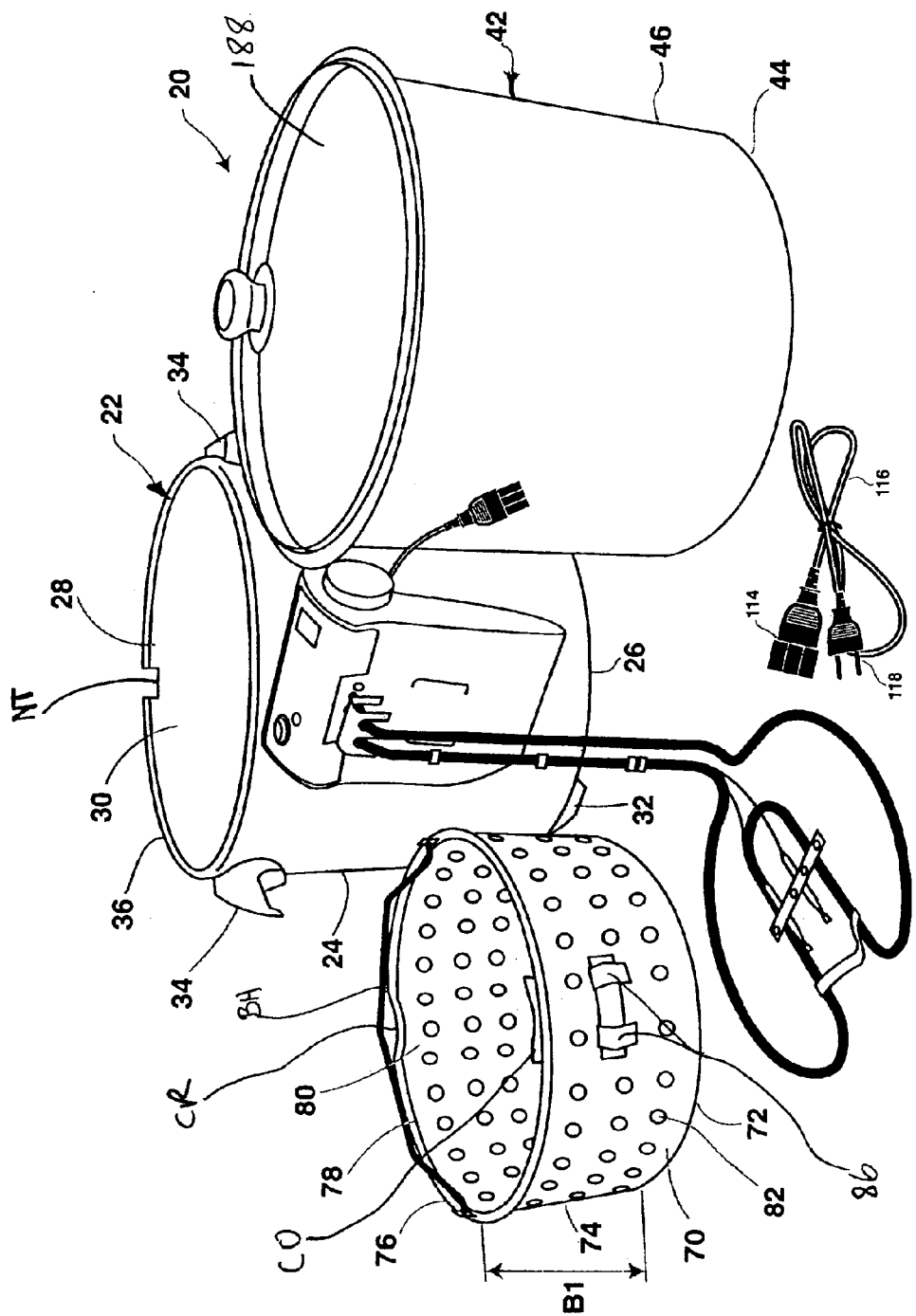
FIG. 1 illustrates a perspective view of the electric cooker of the present invention in an unassembled state.
Figure 2:
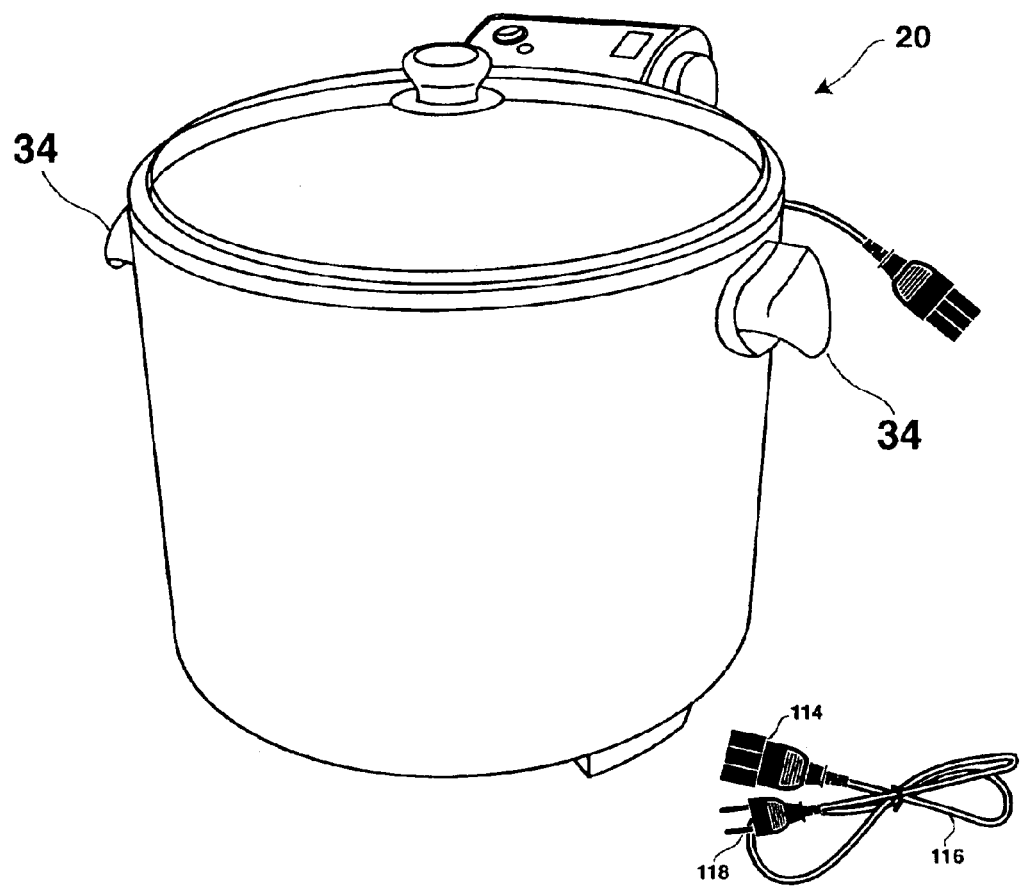
FIG. 2 illustrates a perspective view of components of an electric cooker in an assembled state but for the attachment of the electric cord.

A first embodiment of the present invention is shown in FIG. 1 and features a cooking apparatus 20 comprising shell 22 having external wall 24 (includes, for example, a continuously curved wall such as a circle or oval, a multi-sided wall in horizontal cross-section, and/or a wall having interior wall spacing width deviations relative to the vertical direction), base 26 and upper opening 28 leading into interior cavity 30. Shell 22 is preferably made of a relatively sturdy material such as steel or a heavy gauge aluminum, and can be either a single wall shell or a laminate or a multi-stack wall as in a double walled shell with or without intermediate insulating material (not shown).

Figure 8:
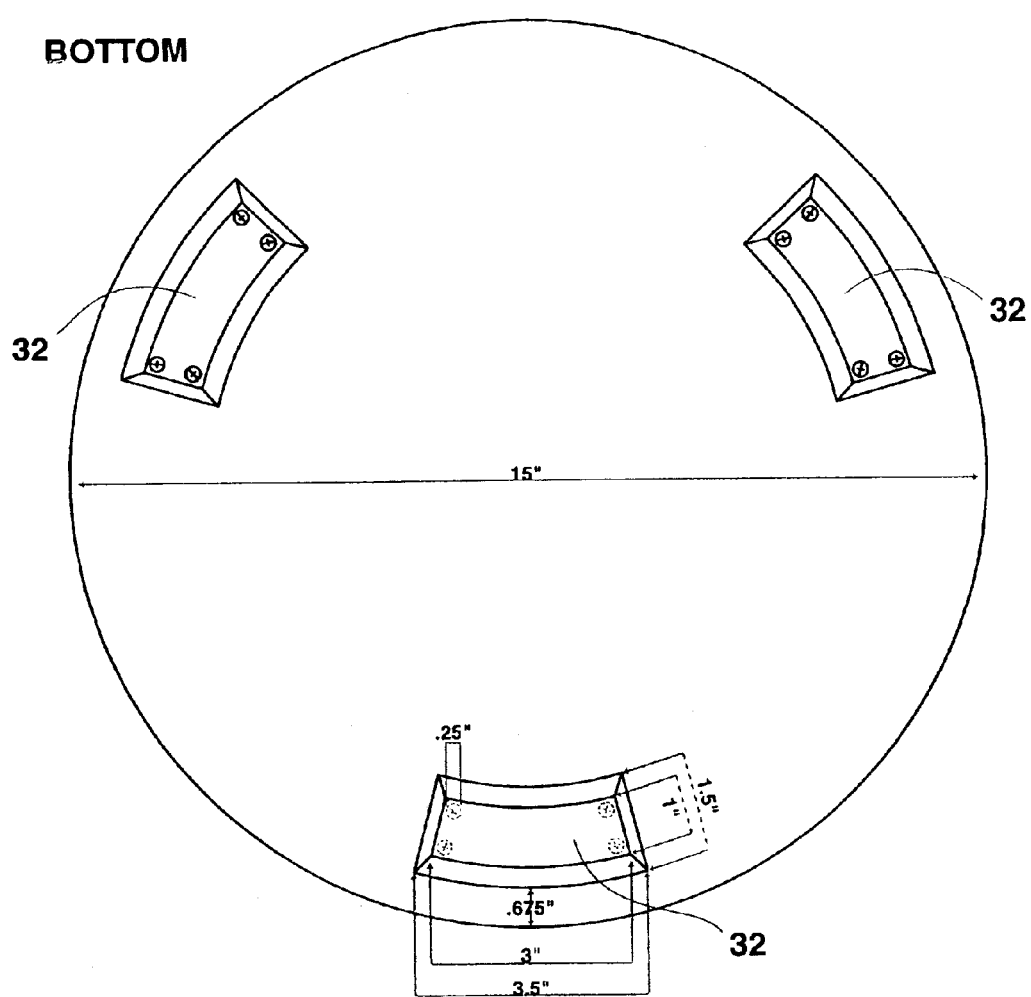
FIG. 8 shows a bottom plan view of an embodiment of the outer shell of the present invention.
Figure 9:
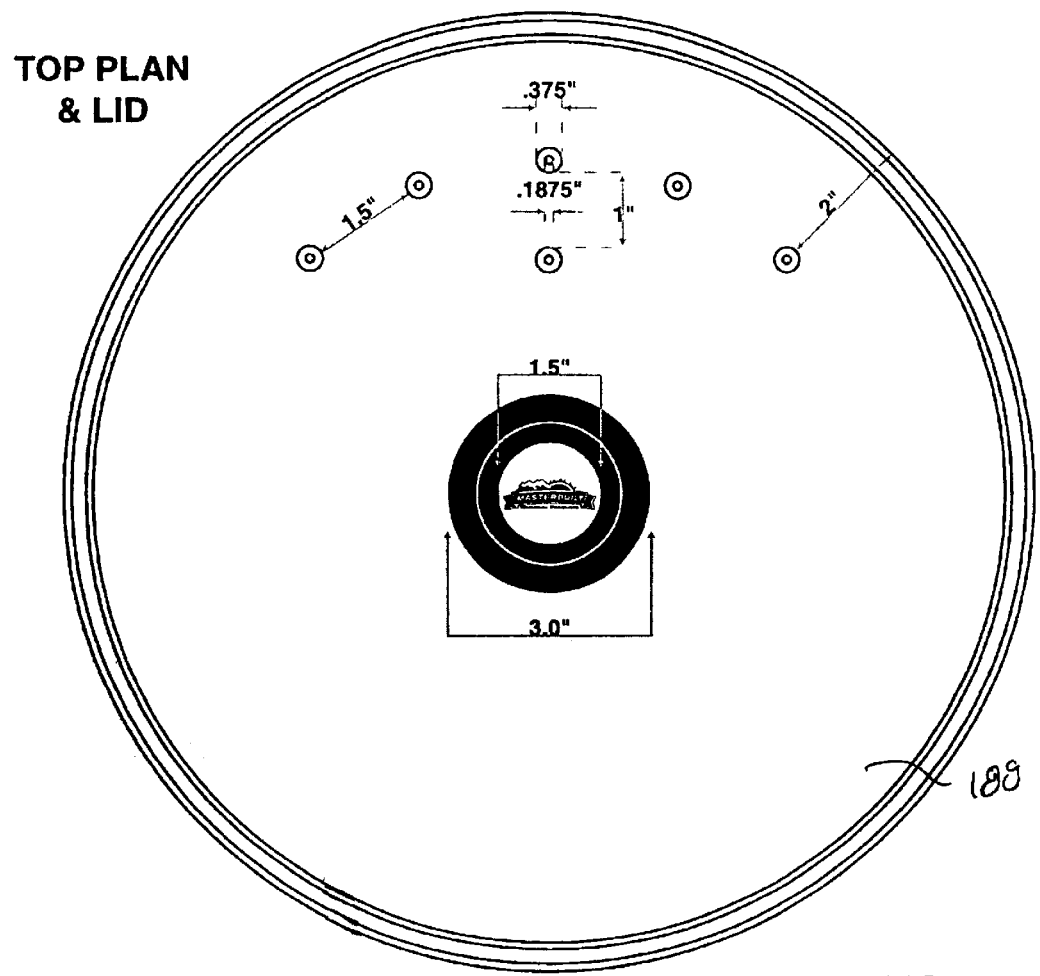
FIG. 9 shows a top plan view of the cooker cover.

As seen from FIG. 1 and the bottom view of the shell in FIG. 8, feet or lift-off means (e.g., individual feet or one or more continuous annular ring members) 32 are fixed to (or integral with) base 26 of the shell and extend downward for contact with the support below such as a table or countertop. Preferably, there are provided a plurality of spaced apart feet 32 (e.g., three with equal 120° spacing around the circumference as shown in FIG. 8 or six with 60° spacing as partially shown in FIG. 6) for preferred cylindrical shell embodiments of the invention. Feet 32 help promote air flow across the bottom surface of base 26 and spacing separation in general between the heat source (resistor and heated cooking fluid) and underlying support so as to help avoid overheating damage to the underlying support.

Figure 5A:
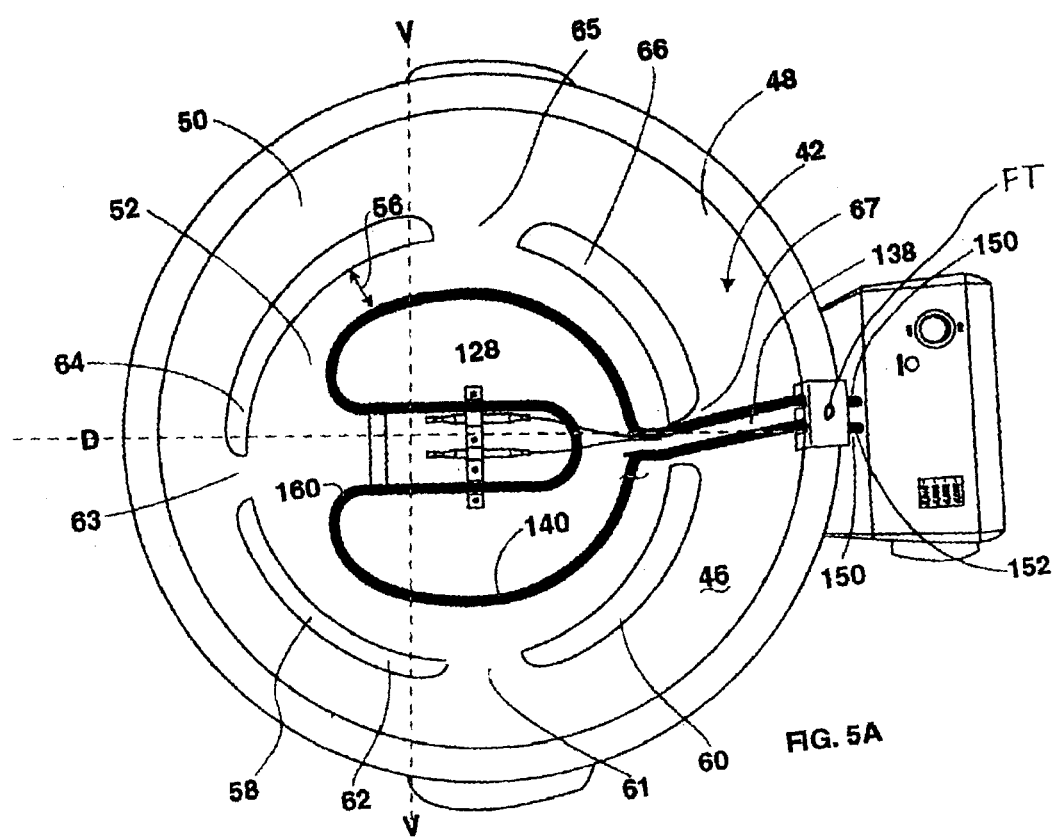
FIG. 5A illustrates a top plan view of an alternate embodiment of the cooker of the present invention with the pot, basket and cover removed, and with the cooking pot having step-in means.
Figure 5B:
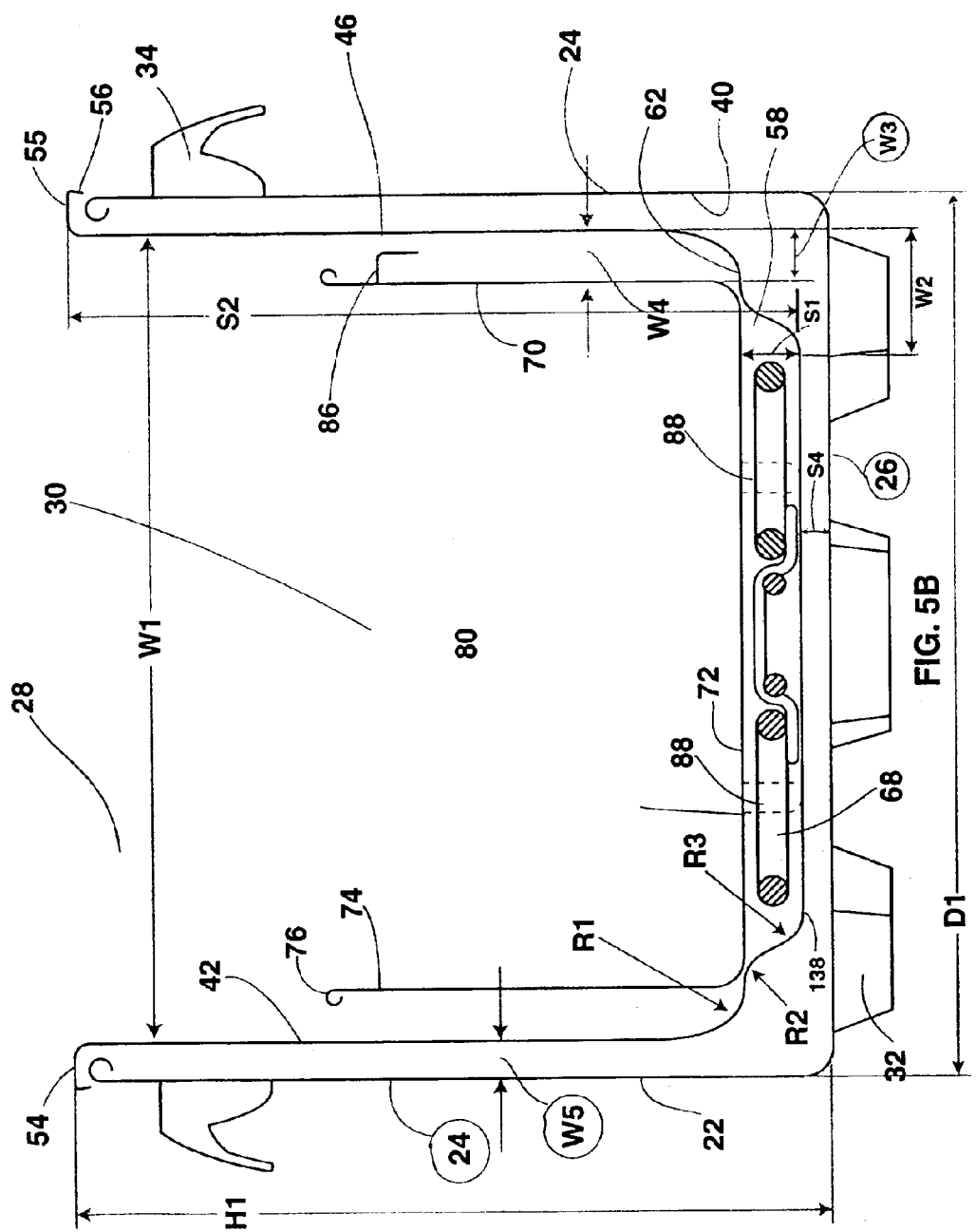
FIG. 5B shows a cross-sectional view taken along cross-sections line V—V in FIG. 5A.

Shell 22 further includes grasping handles 34 shown in the figures to be diametrically oppositely positioned within the upper 15% of the height of shell 22 and below the upper bead or edge 36 of shell 22 having notch NT formed over a small portion (e.g., less than 2 inch circumference). As shown from 5B, the height H1 of the shell from the interior surface 38 of the bottom of shell 22 to upper rim or bead edge 36 and the diameter or average width D1 are sized for the below described accommodation of a container that is itself sized for handling large food items such as an 8 to 18 lb turkey T (See FIGS. 10 and 11) preferably in a horizontal orientation to maintain a lower center of gravity which further lowers the pot tipping potential (e.g., the cooking apparatus is designed to accommodate up to 30° of tilt before tipping when in a fully filled state (e.g., with a maximum turkey size in oil at the full level state)). A preferred height range H1 includes 9 to 20 inches, more preferably 12 to 15 inches with 12.75 inches being well suited based on the additional preferred food sizing characteristics set out below (e.g. a maximum 14 pound turkey recommendation). FIG. 5B further illustrates shell diameter D1 (the interior surface diameter or a maximum width value of the interior surface if other than a circular shell configuration is involved) preferably in the range of 10 to 20 inches or more preferably 12 to 18 inches with 15 inches being well suited for the present invention. These diameter or peripheral width spacing values are well designed to accommodate a container such as the corresponding cooking pot embodiment described below for cooking large single item food objects as in a turkey. The preferred volume presented by the interior shell wall (e.g., a preferred cylindrical shape) or walls of the shell is designed for receiving cooking pot 42 which preferably is formed either with a typical cylindrical design as shown in FIG. 1 or of a design that provides a reduced cooking fluid volume, while still being suited to accommodate large food items as in a whole turkey, which turkey in and of itself, generally occupies a volume that will result in an increase of 35 to 65% in cooking fluid level from a pre-insertion of turkey to a post insertion of turkey (or other large single food item) state. It should be noted that any dimension provided herein is for illustrative purposes and not meant to be limiting relative to the general scope offered by the present invention.

Figure 3:
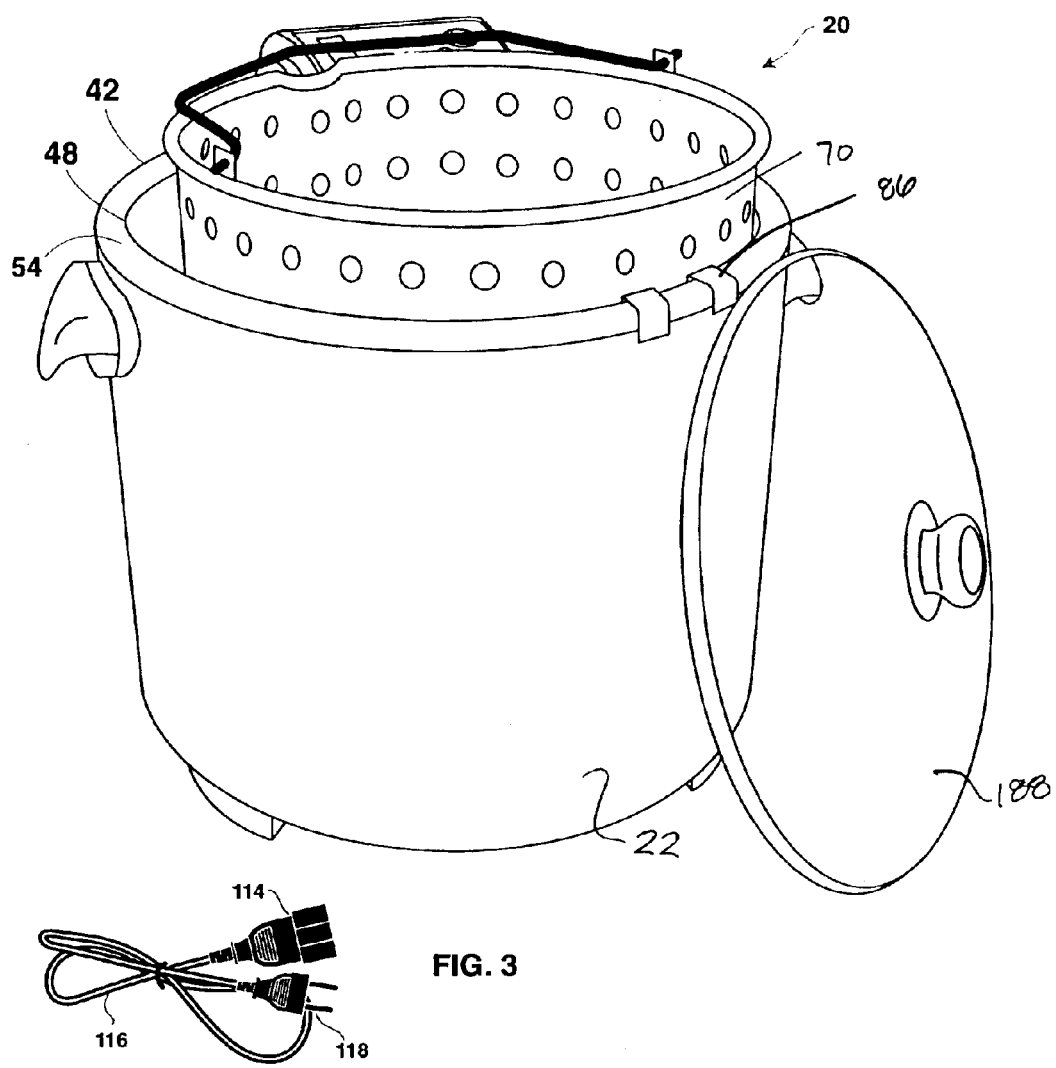
FIG. 3 shows a view of the electric cooker with the cover removed and the basket in a drain mode.

FIG. 1 illustrates cooking pot 42 as being designed for receipt inside cavity 30 of shell 22 and preferably being of a height that provides for some degree of overhang relative to the upper rim of the shell, as illustrated by FIGS. 3 and 5B. In the embodiment illustrated in FIG. 1, cooking pot 42 has bottom 44 (preferably flat on the inner side, but raised or depressed areas on the inner side are also featured under the present invention), side wall 46 (which term is meant to encompass, for example, a single continuous side wall as in a continuous curvature cross-section (circular or oval) or multi-sided configurations as in non-cylindrical configurations and side walls having relative width deviations going in the vertical direction) with interior surface 48 defining upper opening 50 and pot cavity 52 (FIGS. 5A and 5B).

As best seen by FIG. 5B, shell 22 has an upper edge 36 that preferably includes an upper curved or flat support section to provide a contact support region for overlying flange 54 of cooking pot 42. Flange 54 of pot 42 preferably features a first section 55 extending horizontally or more horizontally than vertical and is either planar or curved such as a planar orientation associated with a curved or planar shell upper edge of the shell. In addition, as shown in FIG. 5B, flange 54 further preferably includes a radial outer second flange section 56 that extends vertically or more vertical than the first section 55. The distance between the outer wall surface of the shell's main body, and the interior surface of the flange section is preferably designed for providing a limited radial movement potential relationship while, on the other hand, preferably avoiding a tight or difficult to separate interference fit between flange section 56 and the below supporting shell edge 36 (e.g., a radial clearance of 0 (slight contact all around) to ⅛ inch (limited radial adjustment potential). This flange nesting relationship helps properly align cooking pot 42 within the receiving cavity presented by shell 22 (e.g., establishing an equal radial spacing between the shell and pot at different horizontal cross-sections over the height of the cooking pot as in the upper half to upper quarter of the cooking pot depending on the degree of volume reduction slope in the portions of the cooking pot as described in greater detail below). The radial distance of flange 54 is of, for example, 0.5 to 1.25 inches in radial width There is also preferably provided a suspension spacing S4 of, for example, 0.25 to 1.25 between the exterior bottom surface of cooking pot 42 and the facing interior bottom surface of shell 22 with a 0.5 inch spacing being well suited for purposes of the invention. In addition to being spaced in the vertical direction, the suspended cooking pot also preferably has its outer wall surface spaced from the interior side wall of shell 22 (e.g., spacing W5 of, for example 0.25 to 2.0 inches with 0.75 inch being preferred) which is shown of equal value for more then a majority of the cooking pot height, but can vary as explained below for the cooking fluid volume reduction embodiments and also at the bottom region where cooking pot 42 preferably includes a support step-in means 58.

In an alternate embodiment, (not shown) there is a direct and/or non-concentric contact bottom relationship and/or a direct and/or non-concentric contact side wall relationship. From the standpoint of, for instance, improved exterior insulation the concentric side and bottom suspension spacing arrangements are preferred.

A preferred embodiment of the invention has a cooking pot 42 that includes a preferably integrated hereafter "step support" or step-in means 58 providing for basket or food cooking item support and/or cooking fluid volume reduction. FIGS. 5A and 5B illustrate a first embodiment of a cooking pot with an integrally formed step support 58 which steps radial in form a location coincident with the bottom of the pot in a preferred embodiment and can take on a variety of forms such as the stepped shoulders 60, 62, 64 and 66 arranged in circumferential series along the interior, bottom region within (e.g., a lower quarter) of the side wall 46 of pot 42, with non-stepped in or recessed areas 61, 63, 65 and 67 therebetween as shown in FIG. 5A. Recessed areas 61, 63, 65, and 67 provide for improved cooking fluid circulation between the area immediately above interior bottom surface 138 of pot 42 and along the portion of inner surface 48 of pot side wall 46 positioned above step support 58. Recess 67 does the same as well as providing access means for heater resistance element 134. As shown in FIG. 5B, the stepped shoulders of step-in means 58 are preferably designed to facilitate their being formed integrally (e.g., as a process step or component in a pot stamping or shaping process) with, for example, a concave-convex-concave curved bottom cooking pot 42 sequence represented by radius lines R1, R2 and R3 respectively, or in a less preferred embodiment, suspension inserts (e.g., welded pads) are provided on the shell and/or cooking pot. The In addition to the preferred shell feet and cooking pot suspension (upper flange/bead overlap), there is also preferably provided by way of step support 58 in cooking pot, a suspension spacing S1 between the below described basket or food support means 70 and the interior, bottom surface 138 of the cooking pot. Spacing S1 is designed to avoid direct contact between the below described basket or alternate food support means (e.g., a through or into turkey skewer with bottom platform or spoke arrangement that is sized for contact along suspension means 58) and heating element 68 and/or to provide for cooking fluid circulation between the direct support food holder and the surface 138. When considering the relatively high weights involved in food items such as a turkey, the step-in means provide extra support as compared to reliance solely on, for example, the upper flange 54 of cooking pot and bead 36 of shell for support of the cooking fluid and food item and food support means as in a basket received within the pot and preferably positioned so as to avoid direct contact with a heating source positioned between the food support means (e.g., basket) and the bottom of the cooking pot. Also while steps such as 62 are shown to be greater in circumference than the intermediate recesses such as 63, this size relationship is reversible with the recesses being circumferentially longer than the steps or equal thereto. From the standpoint of avoiding high cooking fluid volume usage, having the steps 62 of longer circumferential length than that of the intermediate recesses (e.g., a 2:1 to 8:1 ratio) is preferred. The recessed side walls are preferably made smoothly contouring to facilitate the pot forming process and can include divergent or convergent orientations to promote fluid channeling. While an integrated and contemporaneously "formed with pot" suspension means is preferred, as noted above, alternate suspension means such as members welded or otherwise fastened to the pot are featured under the present invention, including items that extend through the pot wall before extension into supporting contact relative to the underside or side of the to be positioned basket 70. However, the integrated step in means is preferred from ease in manufacturing and in view of the harsh environment of the cooking fluid.

In a preferred embodiment, spacing S1 between the cooking pot bottom and the bottom of the food support means and/or support contact surface of the step-in means 58 preferably ranges from 0.25 to 2 inches, more preferably about 0.5 to 1.5 inches, with 1 inch being a representative value of a preferred embodiment. The overall height S2 (FIG. 5B) and width W1 (e.g., the interior diameter above the step-in) of pot 42 is designed to accommodate maximum vertical heights and horizontal dimensions of large food items such as turkeys as well as the typically utilized thin layer of cooking fluid that covers a submerged food item(s) and preferably an additional clearance area that is sufficiently high enough up from the cooking fluid upper layer to help ensure retention of bubbling cooking fluid subjected to a maximum temperature generated by heating element 68 (e.g., a maximum heater control setting of 400° F.) below the cooking pot upper edge 54. A preferred height range for height S2 is one that is less than H1 to provide the spacing S4 as in 8.5 to 19.5 inches, more preferably 11 to 15 inches with 12.25 being illustrative of a preferred embodiment height. A percentage ratio for S2 to H1 is preferably 88 to 98%, more preferably 90 to 96% with 96% being an illustrative percentage for a preferred embodiment. The difference between the preferably longer H1 and the preferably lower value S2 is essentially equal to the suspension value S4 when considering that the upper end of the cooking pot has its flange in contact support with the rim of the cooking pot and its thickness is typically somewhat minimal when considering the overall height of the cooking pot.

The interior width or diameter W1 for the side wall portion of cooking pot 42 above suspension means or step-in region 58 shown in FIG. 5B and preferably ranges from 9 to 18 inches, with 12 to 16 inches being more preferred and 13.75 inches being illustrative of a preferred embodiment value. A preferred embodiment features a cylindrical configuration, with diameter W1 (for non-cylindrical shapes, W1 is the average width for the side wall 46 above the step-in region). The maximum diameter of the cooking pot is represented by W1 plus two times the flange 54 width (e.g., 15.375 with an 0.8125 inch flange and a 13.75 W1 value). W2 illustrates the width between the interior surface of pot 42, above any step-in region, and the interior edge of the step-in region 58 such that W2 is representative of the degree of step in for stepping means 58. This step in distance between the two noted locations represented by W2 is preferably 1 to 4 inches, more preferably 2 to 3 inches with 2.25 inches being illustrative of a preferred embodiment.

Width W3 (FIG. 5B) illustrates the width between the outermost step contact point of basket 70 (described below—and while in a concentric cooking position) and the outermost edge of step 58 which coincides in the illustrated embodiment with the cylindrical interior surface of the upper portion of pot 42 shown in FIG. 5B. The interior contact point of W3 is preferably located in an intermediate region of W2 such as at a 25% to 75% distance out from the outer edge of pot bottom surface 138 coinciding with the interior edge of the step-in region. The overall volume of the cooking pot is preferably 25 to 35 quarts, more preferably 25 to 29 with 28 or 29 being illustrative of a preferred embodiment. While the arrangement shown in FIG. 5B is, to some degree, a low volume embodiment (e.g., with the assistance of the step-in 58), the present invention also features alternate lower volume reduction embodiments such as those described below and illustrated in FIGS. 6, 6A, 6B, 6C to 7. For example, the bottom step in means 58 shown in FIG. 5B provides, for example, for a reduction from what would normally be a 30 quart pot to a 29 quart pot (e.g., a reduction of for example 0.5 to 3 quarts via a bottom step in). The aforementioned double step in cooking pot of FIG. 6, for example, having an upper annular step in and a bottom step in means like 58 can provide for even greater cooking fluid volume reduction and provides a reduction in the overall volume of the cooking pot from 30 quarts down to 28 quarts, for example, (e.g., a reduction of for example 1.0 to 4 quarts via a bottom step in and an upper step in), with the upper and lower step ins preferably being below or essentially at the maximum fill line and below the level reached when the food item is inserted.

An additional embodiment of the present invention features basket legs 88 (shown in dashed lines) such that the step-in's are optional relative to achieving basket or food support means 70 suspension, but can still be relied upon for volume reduction. W4 illustrates a spacing between the outer surface of basket 70 and the inner surface of pot 42 (average if varying as in other than a cylindrical shape) and with the basket 70 preferably being in a concentric arrangement inside the pot. Suitable values for W4 include 0.5 to 2.0 inches, more preferably 0.75 to 1.5 inches, with 0.875 inches being as illustrative value.

Figure 12:
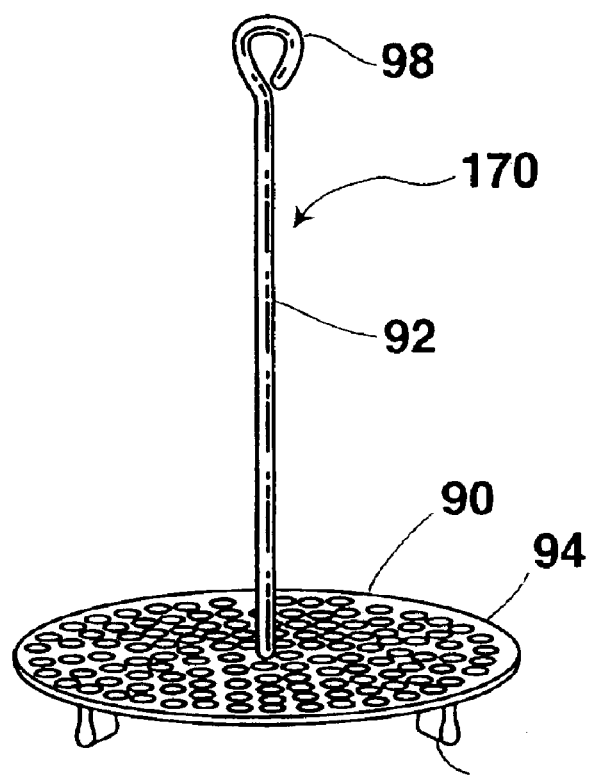
FIG. 12 shows a first alternate embodiment of the food support means.
Figure 13:
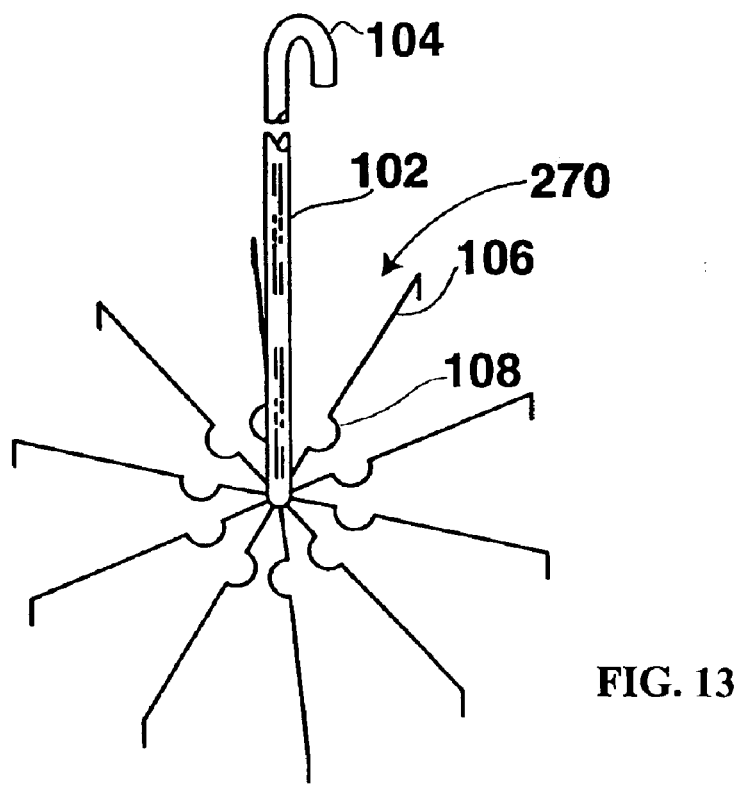
FIG. 13 shows a second alternative embodiment of the food support means.
Figure 14:
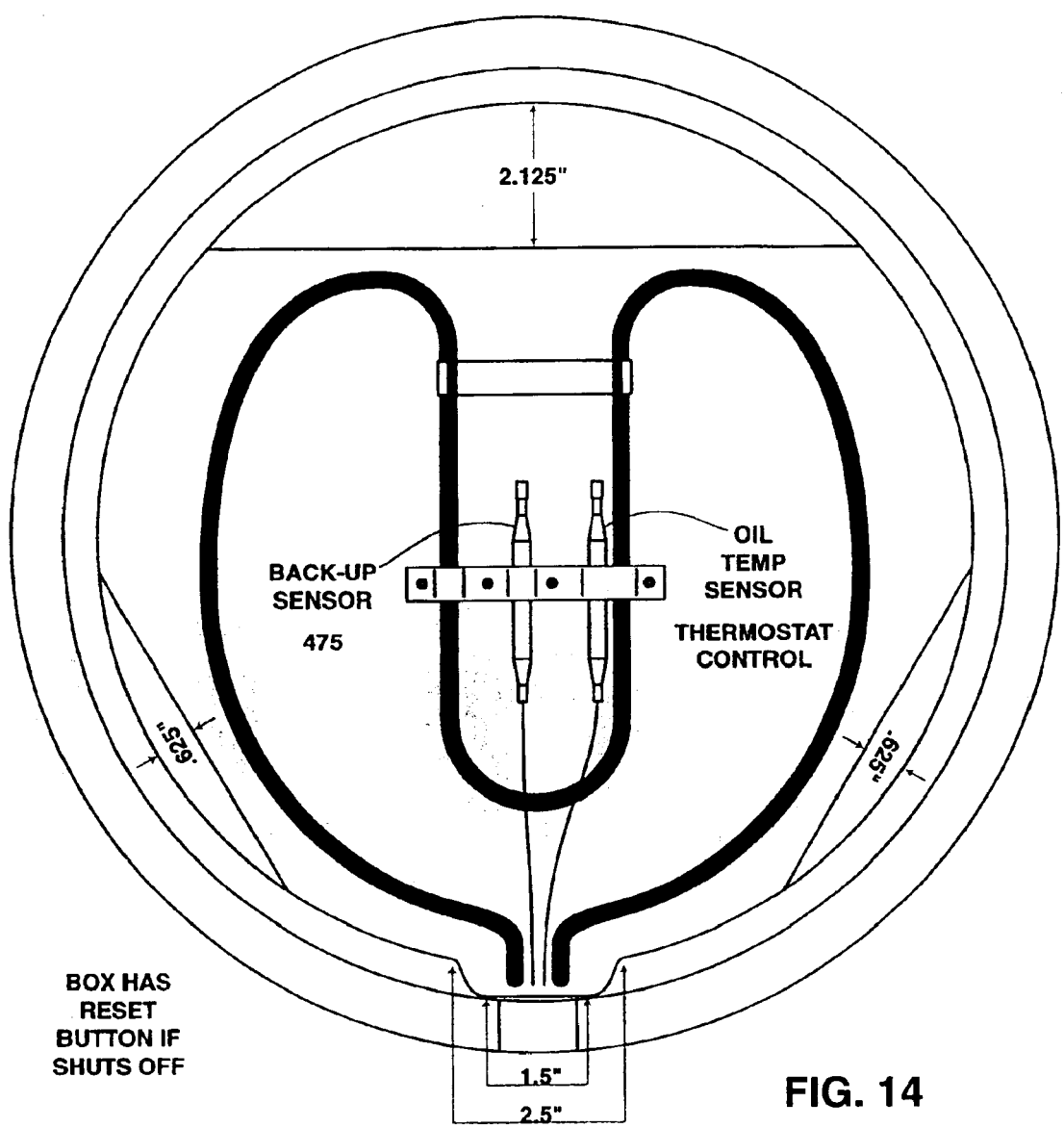
FIG. 14 shows an additional embodiment of the present invention with an alternate low cooking fluid volume cooking pot.

Width W5 illustrates the spacing (average if varying) between the interior surface of shell 22 and the exterior surface of cooking pot 42 above step-in 58. Suitable values for W5 include 0.25 to 1.75 inches, more preferably 0.5 to 1.25 inches, with 0.625 inches being as illustrative value. Food support means 70 is shown in FIG. 1 as a basket, while FIGS. 12 and 13 illustrate alternate food support means 170 and 270, respectively. As shown in FIG. 1, basket 70 comprises bottom 72, side wall 74 and upper edge 76 defining food reception opening 78 leading to food reception cavity 80. Side wall 74 is preferably provided throughout with side wall apertures 82 (with 3 to 6 vertically spaced circumferentially extending rows of apertures preferred). As the basket is designed to provide for deep frying heavy objects such as a turkey (including the added weight associated with post cooking absorption of cooking oil) it is preferably formed of unitary metal structure with apertures formed therein and preferably not of low load wire or metal rod screen or mesh arrangements such as in conventional indoor deep fat fryers, although with suitable strength wires the use of mesh is possible under the present invention. Because of the heavy load possibility the basket is formed of relatively thick aluminum (e.g., at least 1.0 mm thick) material. To maintain sufficient strength there is a greater percentage of solid surface than open surface in the areas where apertures are provided. For example, 0.3 to 0.7 inch diameter holes with 0.7 to 1.5 inch minimum spacing between holes. A series of 0.5 inch holes with 0.9 inch minimum spacing covering all surfaces of the basket provides a good high strength/drain-steam arrangement. In this regard reference is made to copending application U.S. Ser. No. 10/005,311 filed Dec. 7, 2001 and entitled Fryer, Boiler, And Steamer Cooking Apparatus, which application is incorporated herein by reference.

The basket has a side wall that is of sufficient height to adequately retain a large turkey in position (preferably horizontal) within the basket despite the turbulent effects of deep fat frying. For example, a height ratio range of 2:8 to 5:8 relative to the cooking pot. A basket height as indicated is also well suited for steaming typical quantities of seafood such as clams and mussels. A basket height (main body) of about 7 to 10 inches Bottom apertures 84 are additionally provided and are preferably sized and circumferentially serially spaced similar to those in the side wall FIGS. 5B and 7 further illustrate capture hook 86 shown in full view in FIG. 1 and in cross-section in FIGS. 5B and 7. Reference is again made to U.S. patent application Ser. No. 10/005,311 describing a basket with capture hook. The aforementioned U.S. Provisional Appln. No. 60/402,912 describes a reduced volume outdoor cooking pot having volume reduction means as in radially inwardly extending walls. As explained above, the present inventions also includes inwardly directed wall portions or step-in means to help reduce volume of cooking fluid utilized while still accommodating the potential for cooking large food item's as in a turkey and also preferably positioned to double as an underlying basket or food support means contact members.

An embodiment of the food support means includes support means free of any bottom legs. Alternatively, there can be relied upon legs designed to make contact with the pot thus rendering optional step-in basket suspension means 58, or intermediate sized bottom legs such as bumps formed in the bottom of the basket for underlying support contact outside of the cooking pot but still relying on shoulder support for suspension above the resistance heater. As noted above, an alternate embodiment of basket 70 is shown in FIG. 5B features bottom legs 88 designed to replace step support means 58 or as a supplement thereto (stepped portion 58 used primarily for volume reduction). As shown in FIG. 5B, optional basket legs 88 are designed to suspend the bottom of basket 70 above means for heating 68 and are arranged in a position which avoids contact with the heating means over the full range of possible radial movement between the basket and the pot (e.g., until either the basket outer wall or capture hook 86 contacts the interior of the pot).

FIG. 12 illustrates an alternate embodiment of food support means 170 having a turkey or large food item contact plate 90 having a diameter similar to the bottom of basket 70 so as to rest on the pot's basket suspension means 58 when inserted into pot 42. Food support means 170 includes a turkey or food item skewer pole 92 extending up from plate 90, with plate 90 also including a plurality of apertures 94. Feet 96 extend down from plate 90 and are preferably of the intermediate length described above which are suspended above the bottom of pot 42 when plate 90 is resting on suspension means 58, but which provide for suspension of plate 90 following removal and placement on an external support surface such as a countertop, cooling container or plate (not shown) with the suspension and apertured plate providing for cooling and controlled dripping into a suitable cooling container or plate or absorbent sheet. Skewer pole 92 features grasping loop 98 which is positioned above the turkey held on the skewer pole and thus provides a grasping location for a grasp handle (see FIG. 10 for an illustration of grasping handle 100 being used as a bailing handle grasping means for basket 70 removal). Suitable indents for the radial ends of the spikes are also preferably provided to properly position the intermediate bump members away from the resistance bar in the event they extend down sufficiently.

FIG. 13 illustrates an alternate food support means 270 having a skewer pole 102 with grasping end 104 and spokes 106 having a radial extension suitable for suspending support means on suspension means 58 of pot 42. Spokes 106 are shown to include optional intermediate bump sections 108 which help in suspending the food item to some degree off an underlying post cooking cooling surface (not shown) in the suspension means 58. Various other embodiments of food support means are also featured under the present invention which preferably are able to accommodate a large food item such as a turkey and retain the food item suspended in the cooking pot either based on coordination in configuration to have a suspension means of the cooking pot suspend the food support means and/or to be self suspension supporting (e.g., legs) either outside of the cooking pot or both in and out of the cooking pot.

In a preferred embodiment the height of basket 70 is at least 25 percent of the total height of cooking pot 42 and more preferably falls with a range of ⅜ to ⅞ of the cooking pot. As shown in FIG. 3, capture device 86 (e.g., a capture hook formed with two circumferentially spaced hook prongs) is positioned heightwise on the basket to provide some drainage clearance when the pot and basket are lifted out of contact with the cooking fluid which during cooking covers over the turkey. As seen from FIG. 10, the dripping fluid returns close (some absorption involved) to a turkey pre-insertion height level (e.g., a volume of 10 quarts (or the roughly equivalent amount of 10 liters of cooking fluid suitable for a turkey of about 12 to 14 pounds in weight.)

Figure 15:
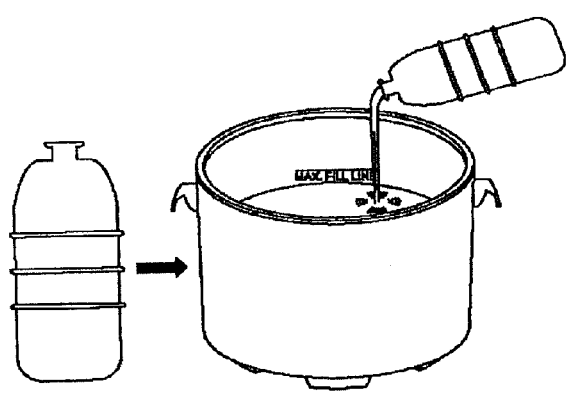
FIG. 15 shows a view of the cooking pot being filled with cooking fluid to a level between the max/min fill range.
Figure 10:
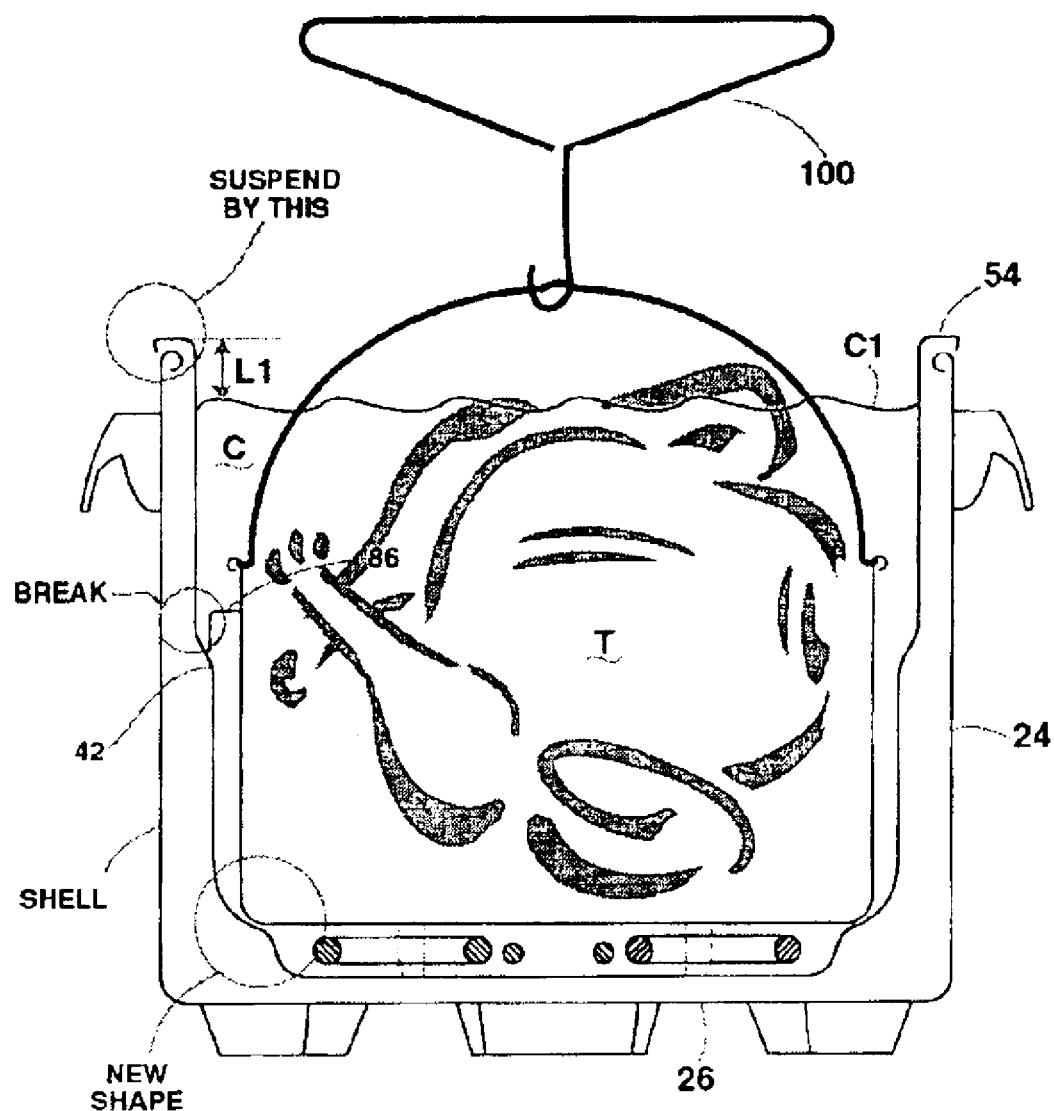
FIG. 10 shows a cross-section view similar to FIG. 7, but with turkey positioned in the cooking pot prior to lid closure.
Figure 11:
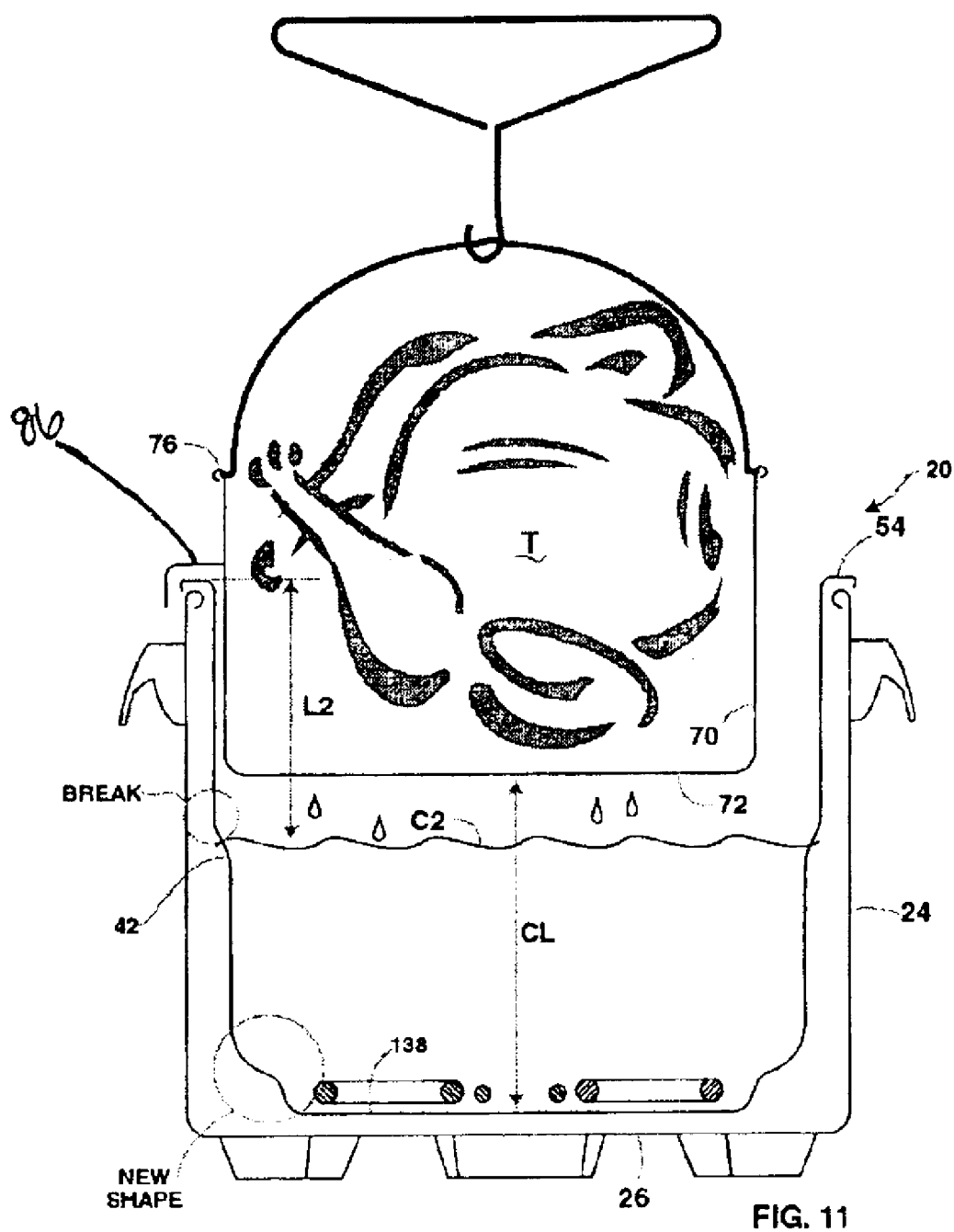
FIG. 11 shows a cross-sectional view with the basket in a drain position after cooking the turkey.

In other words, the capture hook is positioned on the basket such that when it is placed into drainage mode through placement of the capture device into contact with the supporting surface of electric fryer pot 42, such as the upper flange or bead edge 54, the under surface of basket 70 is sufficiently off the remaining cooking fluid surface level as to provide for drainage of cooking fluid from the suspended basket. FIGS. 10 and 11 illustrate these two different cooking fluid states, with FIG. 10 illustrating a cooking mode with turkey T submerged under upper surface level C1 of cooking fluid C and level C1 being a distance L1 below the upper contact surface 54 of the cooking pot in a cooking mode state with the upper end of turkey T submerged or sufficiently close to level C1 to provide sufficient cooking heat temperature. Suitable values for L1 include 3 to 6 inches with 3.75 inches being well suited under the present invention or 20 to 50% of the overall height of pot 42 with 25% being a suitable percentage. Distance L2, representing the height from the upper edge of cooking pot 42 to level C2 of the cooking fluid when the basket and turkey are suspended above C2 is preferably 5 to 10 inches with 6.75 inches being well suited for uses of the present invention, and with 45 to 65% of the overall height being preferred and with 55% being preferred. This level C2 is roughly equivalent (e.g. within an inch or two) to the fluid fill line shown in FIG. 15 (e.g., a 10 quart line although there will be a minimal amount of cooking fluid volume loss due to cooking and food absorption). In a preferred embodiment, with a 12.25 inch high cooking pot, there is featured a 10 quart fill line at about a 5.5 inch height from the bottom of the pot and about 3 inch anticipated clearance for cooking fluid level post turkey insertion leaving about 3.75 inch clearance above the post insertion fluid level to accommodate, for example, foam ups, etc.

The clearance space between the bottom of suspended basket 70 and the bottom surface 138 of cooking pot 42 is shown in FIG. 11 as clearance distance CL and is controlled by the relative position of capture device 86 which is (the contact portion) preferably about 0 (essentially at) to 4 inches from upper edge 76 of basket 70 or more preferably 1 to 3 inches down from upper edge 76 or within an intermediate range of 0 to 45% of the full height of basket 70.

An additional feature of basket 70 includes clearance recess or groove CR which runs vertically along the side wall of basket 70 between the baskets upper edge and a lower end of the basket (preferably a rectangular cut out CO as shown in FIG. 1 which facilitates the concave protrusion radially inward and preferably extends to the bottom of the basket). As explained in greater detail below, clearance recess CR is dimensioned to avoid direct contact between the basket and a vertical component of a heating unit 138 (FIG. 5A) when the basket is properly oriented such that the recess CR is aligned with the heater portion 138 which is also at a location aligned with notch NT in shell 22. Recess CR is also preferably circumferentially spaced by 90 degrees from the contact ends of bailing handle BH with basket 70.

Figure 4D:
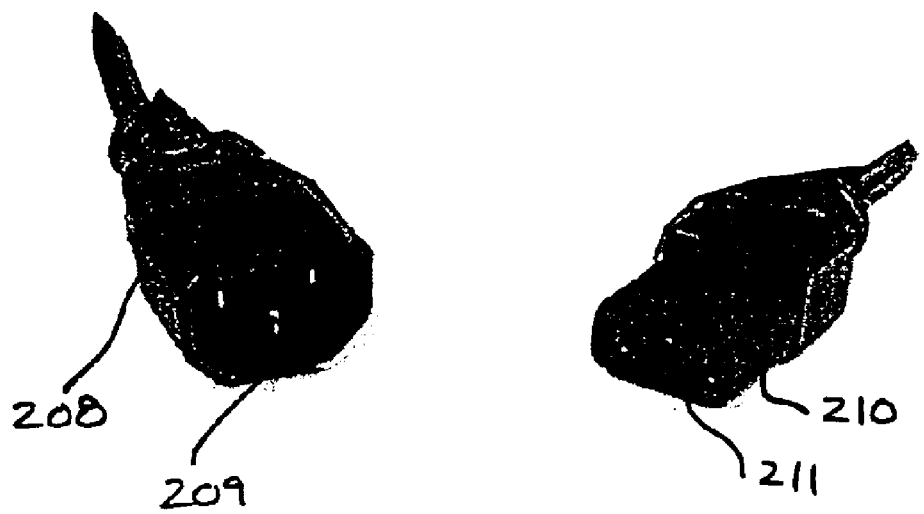
FIG. 4D illustrates a close up view of a preferred electrical connection for connecting the heater unit to a power source.

With reference to FIGS. 4A, 4B there is illustrated heater device 110 comprising heater element or heater means 68 and control unit 112. Control unit 112 is shown in FIG. 4B to include electric cord receptor 113 which receives connector 114 of electric cord 116 which has on its opposite end standard wall plug 118. Control unit 112 includes temperature information supply means 120 (e.g., an electrical LED display or mechanical printed indicia back and with dial, spotter etc.,) designed in conjunction with the desired temperature range to be utilized in the fryer such as a range of 0 to 400° F. or 0 to 450° F. which ranges are well suited for turkey frying and well below a flash point temperature of cooking oils to be used (e.g., peanut oil). Control unit 112 further comprises on/off switch (e.g., pressure button) 122 which has an integrated light such that when the button is placed on the light shines below the button. There is also preferably provided light 124 which turns off from an initial on state when the on button is pressed when a set temperature level is reached or some other signal means (e.g., flashing light and/or audible sound when the level is reached). Temperature setting means 128 is supported on main housing 126 of control unit 112 and is preferably in the form of a turn dial 128 or an electric temperature setting device such as direction arrow press buttons and/or number touch buttons. Although not shown the interior of main housing 126 supports the electrical connections involved in supplying power for cord 116 to the heater element of the heating unit at the desired level to conform to the temperature set by temperature setting means 128 as well as the safety controlling means described below.

Figure 6:
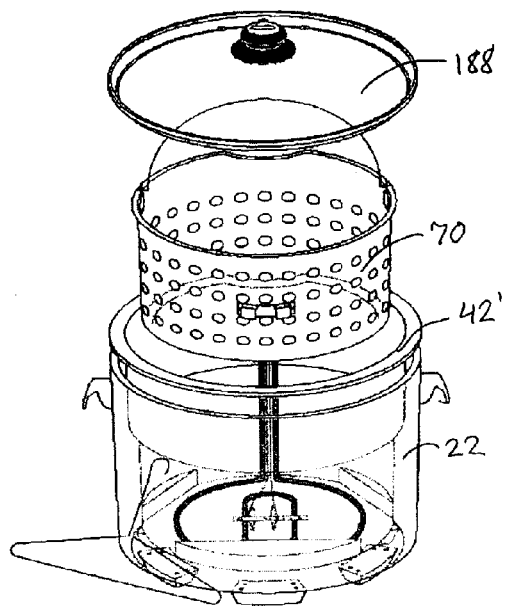
FIG. 6 shows an exploded view of the above featured embodiment of the present invention with a "double step-in" cooking fluid volume reduction cooking pot.

As can be seen from FIGS. 4A and 6, main housing 126 has interior surface 130 which is elongated and arranged essentially vertically, or with a common slope as the supporting outer shell. The interior surface has means for engagement with shell 22 to help provide a stable relationship. In one embodiment that connection device is comprised of a pair of male projections PR1 and PR2 as in T-shaped or oppositely outward arranged C-shaped cross section projections. These projections extend outward toward the shell and are arranged for sliding connection in female reception grooves (GR1 and GR2) formed in block BL connected to the outer side of shell 22 as shown in FIG. 6C. Grooves GR1 and GR2 have an open top and a blocked off bottom to assist in proper height positioning. Reverse female and male connection arrangements are also featured under the present invention.

Figure 18:
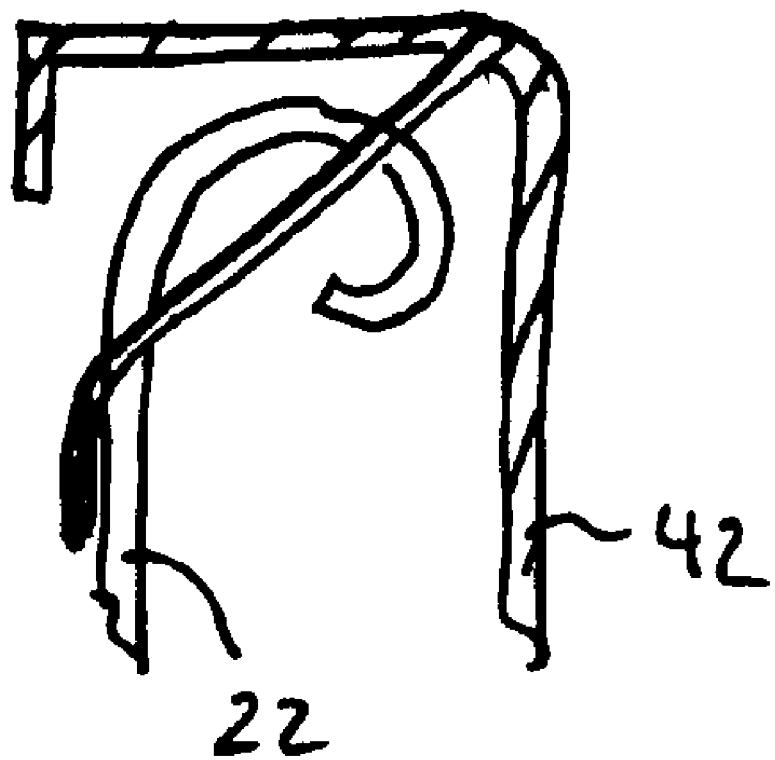
FIG. 18 shows a notch of shell and tab of cooking pot relationship.
Figure 19:
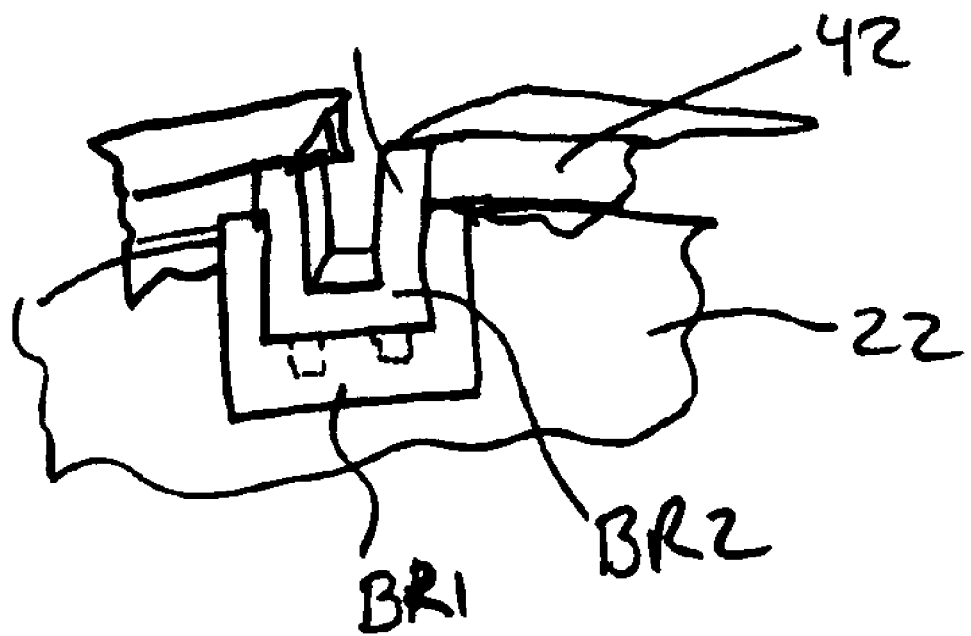

Heater means 68 includes main body mounting bracket 132 which is securely fixed to housing 126 and supports heater or resistance element 134, which in a preferred embodiment is a resistance heater bar which has two prong ends for electrical connection in the control unit's housing. Heater element 134 is shown to include upper section 136 in a direct supporting relationship with mount 132 and is shaped to extend over and to opposite sides of upper edge or flange 54 of pot, preferably in horizontal fashion in its extension out from mounting bracket 132. Bracket 132 is provided to secure heater element in a preferred generally concentric spacing relative to the interior side wall of the pot (i.e., preferably both a side wall spacing and a suspension arrangement relative to the bottom surface of the pot). Also, notch NT provides a clearance location for the passage of the two prongs of the shaped resistance bar extending over the upper edge of notch NT into its reception area of main housing 126. In combining cooking pot 42 and shell 22 together there is preferably an arrangement featuring a tab member that is provided by way of a pair of circumferentially spaced cuts and a bending down to, for example, 45 degrees and a bending of any radially outward overextending portion down against the side of the shell. This arrangement is shown in FIG. 18 and helps in locking the two components together and helps in covering over a gap in between the shell and cooking pot. In an alternate embodiment shown in FIG. 19, the notch recess receives a connection block liner BR1 which is designed for a male/female connection with a corresponding connection block BR2 provided by the cooking pot as in a downwardly extending block member sections (spaced apart to accommodate the upper, horizontal components of the resistance heater bar).

Heater element 134 further includes more vertical intermediate section 138 (true vertical or, close to true vertical (±10°), or with a slope corresponding or within 10° to the adjacent most surface of cooking pot 42 when the heater device is in operational position) which extends for essentially the full length of the interior surface of cooking pot but for a bottom of pot clearance spacing as shown in FIG. 5B of, for example, a spacing SB of 0.125 to 0.750 inch above the interior bottom surface of pot 42, which is suitable to avoid direct pot contact and provide some degree of cooking oil circulation under the heating element bottom section 140. With notch NT accommodating heater element thickness spacing below cooking pot upper edge and the relatively thin connection bracket 132, the overall vertical length of section 138 is essentially equal to the height of pot 42 but for the clearance spacing of SB between the lower edge of the bottom heater section 140 and the bottom of the cooking pot. Heater element 134 further has its bottom section 140 designed to extend in parallel fashion above the bottom 138 of pot 42.

Connection bracket 132 is preferably U-shaped and has an enlarged upper wall 144 which is sufficiently sized as to bridge the notch NT in shell 22 and can either be curved to correspond with the curvature of the shell or not curved since the notch is relatively small 2.0 inches or less in circumferential or length. Connection bracket 132 features fastener reception hole for receiving fastener FT (e.g. a screw designed to connect with an underlying component of the assembly or a clamp combination with underside of an adjacent shell flange). enlarged upper wall 144 extends into front and back three prong arm sections 146 and 148. Each three prong set defines two intermediate slots spaced apart by a middle prong in the set. As seen from FIGS. 4A and 5A, for example, heater element 134 has a pair of generally horizontal leads that extend from the above noted electrical contact prongs positioned within the control housing and which are further supported by strengthening plate 142. Each of the resistance lead portions form one half of upper section 136 in its extension out from mounting bracket 132.

FIGS. 4A and 5A thus illustrate a first embodiment of heater element 134 having an upper section 136 that features resistance element segments 150, 152 that extend into prongs (not shown) within housing 126 and into electrical communication with the interior control elements (internal controls know per se and thus also not shown). The interior control elements establish a desired heating level based on controlling the output from the electric outlet energy source to the illustrated resistance heater unit 134 in accordance with the setting established by temperature control dial or temperature control setting means 128. Thus, one of segments 150, 152 is an electrical output line segment and the other an electrical input line segment for the continuous resistant heater element 134. Segment 150 is of a radial length suitable to clear the upper rim of both the cooking pot 42 and shell 22 and leads into a first (151) of two smooth concave (opens down) interface segments 151 and 153. Concave heater element segment 151 (which is bisected by a vertical plane) extends down into a first vertical segment 154 of the pair of more vertical segments 154, 156 which together form more vertical intermediate heater section 138. As noted above, segments 154 and 156 are more vertical than segments 150, 152 and they extend down from the level of the respective more horizontal segments 150 and 152 for preferably at least 90% of the overall pot 42 height. Segments 154 and 156 are also shown to extend in parallel fashion down from their upper smooth convex curve interface 151, and 153 with the inner pot ends of segments 150, 152. Also any length values for the horizontal and vertical sections are defined on the basis of inclusion of any interface section that extends from an intermediate point of bending along the interface section into the section whose length is being referenced.

The lower end of intermediate section 138 (i.e., the lower ends of the vertical segments 154 and 156) interfaces with bottom section 140 by way of a double curve combination on each side with the first curved interface section in each combination including a convex (opens upward and is bisected by the same vertical plane bisecting the corresponding upper curved interface) intermediate section (155 and 157) and a second curved interface section (159 and 161) in each combination includes a generally horizontal curved section (bisected by a horizontal plane) opening radially outward such that the immediately adjacent respective portions of the bottom section extend outward from the intermediate section to initiate a curvature that corresponds to some degree to the curvature (or peripheral extension) of the cooking pot in which the bottom section is received and suspended above the cooking pots lower surface 138.

As seen from FIGS. 4A and 5A, a preferred embodiment includes a horseshoe shaped bottom heater section 140 featuring a first side outer curved portion 158 having a curvature that preferably generally conforms (e.g., is concentric) over a majority of the side length of the heater and/or a quadrant of the cooking pot curvature as in the case of a cylindrical step-in portion or is close to concentric as in an inch or two or less of radial deviation relative to the spacing to the outer radially adjacent point on the cooking pot for the noted majority and/or quadrant of the cooking pot. When a straight line step in is featured as in FIG. 6A the concentric arrangement is relative to the curved area of the cooking pot above the step in. Also, if other than a smooth curving cooking pot is used, the exterior of the heater bar is preferably designed to generally conform in configuration to either the bottom step in portion or the interior wall surface of the cooking pot above the step ins. In a preferred embodiment, first side outer curved portion extends in common or generally common curvature for 50 to 100% of the 180 degrees represented by the diametric line D extending midway between the vertical segments 154 and 156 and more preferably 70 to 95% of the same. Also the heater element "halves" 164, 166 having respective outer curved sections 158, 160 are preferably symmetrical when the cooking pot configuration is symmetrical. In a preferred embodiment the radius of curvature of each of sections 158 and 160 generally conforms to the that of the cooking pot and the spacing S6 is preferably between 1 and 3 inches with 1.5 or 1.75 relative to the most interior step in edge being well suited for use with a cooking pot having a W1 value (e.g., diameter shown in FIG. 5B) of 13.75 such that heater spacing S6. The suspended heater relationship can be seen in the plan view provided in FIG. 5B showing the heater element 134 held in a suspended state relative to both cooking pot 42 and supporting outer shell 22. The length of the segments in a direction parallel to line D is preferably about 75 to 95 of W1 while a spacing width for the opposing parallel extending inner heater bar segments taken along a line extending transverse to line D is preferably about 15 to 40% of width W1, with 20 to 25% being preferred.

FIG. 4A shows heater element halves 164, 166 having inward extensions 169, 171, extend inwardly from outer most edges sections 168, 170 generally parallel and spaced to opposite sides of the diametric line D as noted above and are spaced from line D (e.g., 0.75 to 2 inches) and merge to form an integrated or monolithic heater bar at internal curve section 174. Sensor frame support 176 extends between and is connected at opposite ends to respective inward extensions 169, 171 and hold first and second sensors 178, 180 which are preferably thermistor temperature sensors with different temperature control settings and in communication with control unit 112 via sensor lines 182, 184 which are banded to one of the vertical heater sections (e.g., 154) so as to avoid dangling and potential catching of the sensor wires 184, 186.

Temperate sensors 178, 180 are preferably designed for different functions with one of the two (e.g., sensor 178) sensing temperature and in communication with a control unit sub-system (not shown) that is also in communication with the temperature setting means 128 and current temperature display means 120 such that the sensor 178 senses current oil temperature at the bottom of the pot and control unit 112 determines whether additional electric current needs to be supplied to raise the oil temperature or whether a lowering or discontinuation of current supply is warranted to avoid overheating relative to the set temperature. In addition control unit sends a signal to display means 120 to display the current sensed temperature within a preferred display ranges of for example 0 to 400° F.

The second of the two sensors is preferably a fail safe sensor which shuts down all power if a high temperature is sensed (e.g., 450° F. or 475° F.) This failsafe features is well below the ignition temperature of cooking fluids such as peanut oil (e.g., below 600° F.) FIG. 4B illustrates the outer face of main body 126 which includes a reset button RB that allows for a re-initializing of the control unit and heater elements when the temperature drops below the second sensor threshold.

Thus, in use, the cooking pot 42 is inserted into shell 22 followed by the attachment of heating means 68 such that bottom heater element section 140 is suspended above the bottom of the cooking pot 42, and control unit 112 is properly and stably supported by the combined cooking pot and shell flanges/upper bead combination preferably in conjunction with notch NT as well as projections PR1 and PR2 noted above. There is then placed up to, for example, a 14 lb turkey (as per the above most preferred apparatus dimensions although the present invention includes an expansion of sizes such as closer to the upper ends of the noted ranges for holding an even larger turkey such as an 18 pound turkey. The basket volume is shown designed to receive for example a 14 pound turkey in contacting fashion (e.g. the diameter of the basket is made to generally correspond with the average length of a turkey at 14 pounds weight). Suitable cooking fluid as in cooking oil for a turkey or water for shellfish is supported up to the fill line (e.g., 10 quart amount). The control unit's temperature setting means 128 is then adjusted to a desired temperature level (e.g., 350° F. which is a setting suitable for cooking a whole turkey). For cooking a 14 lb turkey, the following formula is preferably used (3 min. ×# of lbs of turkey)+5 min. (thus, for a 14 lb turkey, (3×14)+5 =47 min). The turkey is placed within cooking basket 70 preferably in a horizontal arrangement and the basket and turkey are slowly placed in the cooking fluid with the assistance of handle 100 after the cooking fluid is displayed as having reached the set level (preferably by way of sensed temperature amount display at 120 and the turning on of a signal as in a light (DS) off and/or audible signal). The cover 188 is then placed on and the cooking time monitored. Pre-insertion while the cooking fluid is cool is also possible under the present invention with an appropriate extension of time under the above formula.

When the signal is generated for completion of the turkey for the desired time setting (in addition to temperature sensing a timer can be provided or use made of the cooking timer described in U.S. patent appln. Ser. No. 10/371,194, filed Feb. 24, 2003 and entitled Cooking Facilitator to Applicant Masterbuilt which is incorporated herein by reference.

Once the desired cooking time is reached, the cooker is turned off (e.g., unplugged) (either automatically by the control unit or manually) and the cover removed and then the basket (or alternate food supporting means) is removed with the assistance of grasping handle 100 as shown in FIG. 10. The basket is lifted sufficiently high enough for catching grasping hook 86 on the side of the combination cooking pot and shell flange/upper rim. Following a period of food oil drainage from the food product and cooling, the turkey is then removed to a suitable food preparation area.

After sufficient cooking fluid cooling off (e.g., 2 hrs for water, 5 hours for oil cooking fluid) the cooking fluid can be properly dispensed (e.g., an oil receptacle). The earlier exposed heating means 68 sensor casings and control unit housing are then preferably cleaned with a damp cloth or sponge using a mild soap. The remainder of the non-electrical components being dishwasher safe following disassembly.

Figure 6B:
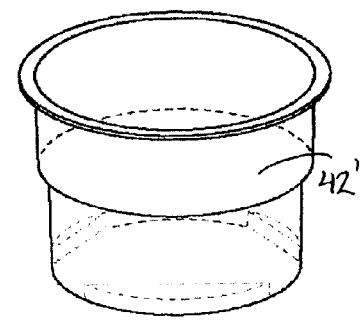
FIG. 6B shows a perspective view of "double step-in" cooking fluid volume reduction cooking pot alone.
Figure 6A:
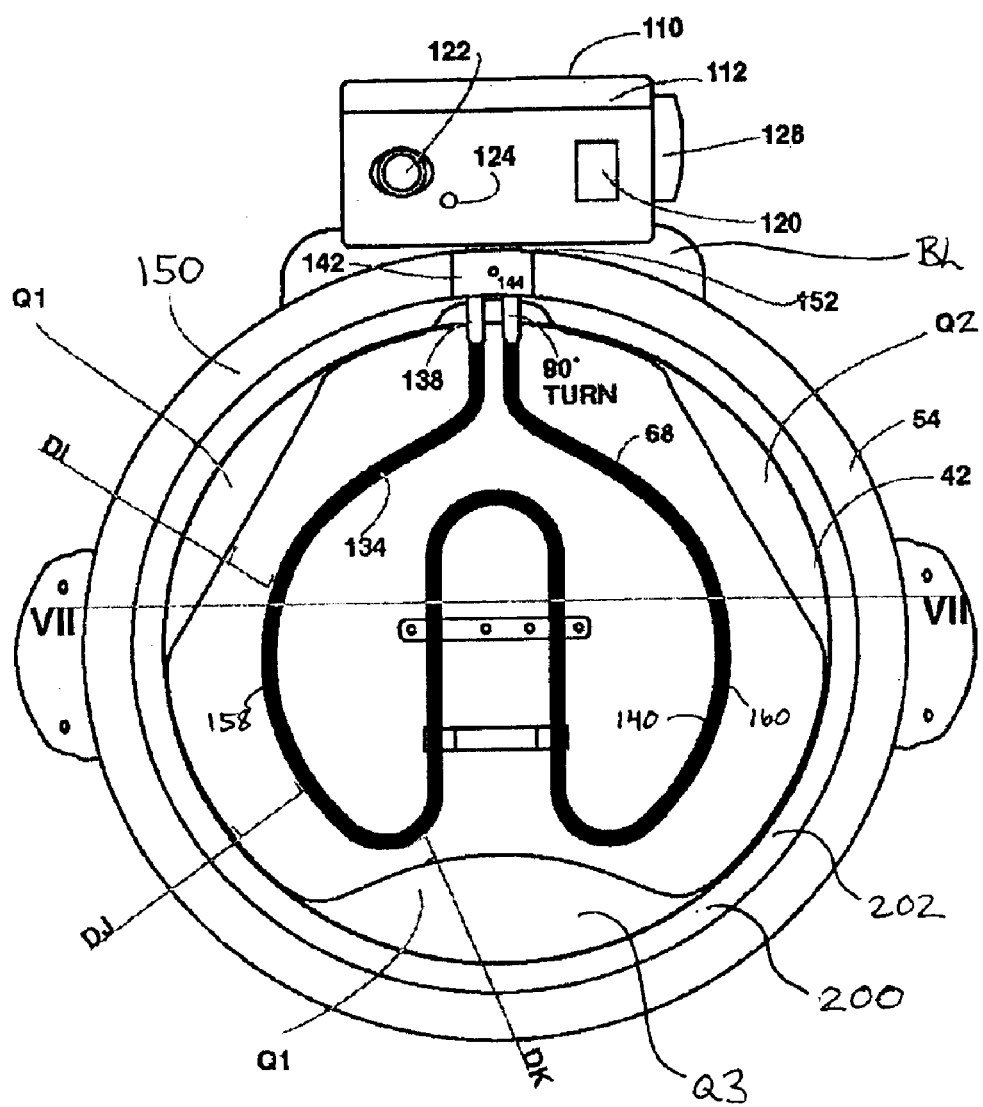
FIG. 6A shows a view similar to FIG. 5A with a preferred "double step-in" cooking fluid volume reduction cooking pot and with the temperature sensors removed.
Figure 6C:
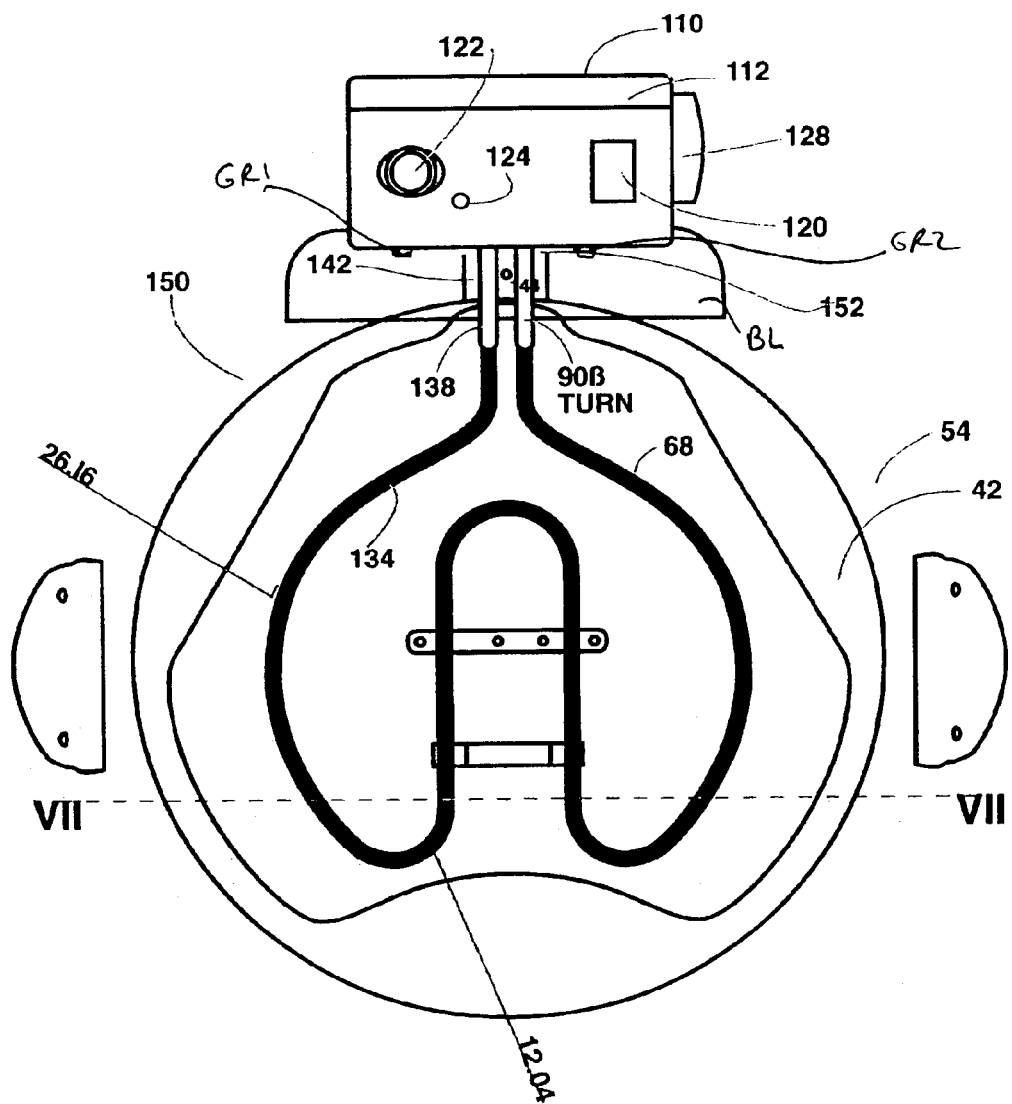
FIG. 6C shows a view similar to FIG. 6A but with an alternate embodiment of the cooking pot.
Figure 7:
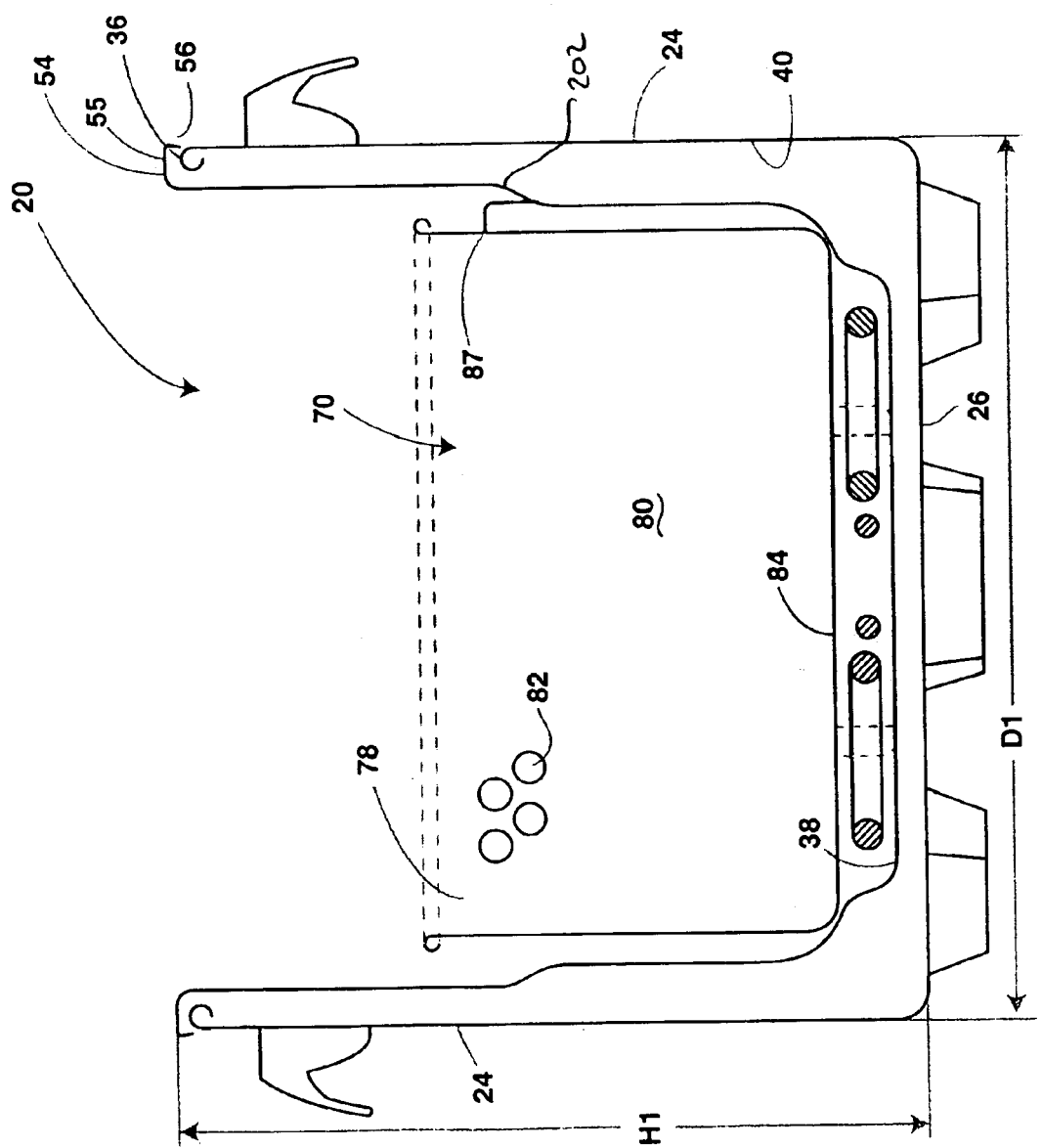
FIG. 7 shows a cross-section view taken along cross section line VII—VII in FIG. 6A together with a basket inserted.

FIGS. 6A–6C and 7, a illustrate an alternate embodiment of the invention showing multi-step-in cooking pot configurations designed to reduce volume while still providing for both heater element and cooking basket placement and side edge clearance FIG. 6B illustrates a similar arrangement shown in FIG. 5A but for there being provided an even further cooking fluid volume reduction embodiment wherein cooking pot 200 features step-ins of variable radial extension so as to provide support to the basket or alternate food support means. The radial thickest portions are shown to the left and right step ins $Q_1$ and $Q_2$ relative to a central positioned control unit and a diametrically opposite region $Q_3$ which is the thickest region and preferably as a convex inner edge (while the other step-ins Q1 and Q2 are preferably straight edge). The radially inward curved extension wall of step Q3 preferably in centrally positioned relative to the open end of the horseshoe shaped horizontal portion of the heater resistance bar shown. FIG. 7 also show the double step-in arrangement with upper annular step-in 202 which is preferably about at the half way level of the height of the cooking pot (e.g. a 35 to 65% range with about 50% being preferred). Hook 86 is shown to extend down to a location above the upper step-in 202 and preferably within an inch or two thereof.

FIG. 6A also illustrates the generally concentric relationship between the outer curved edges 158 and 160 relative to the upper portion of cooking pot 42' (the prime representative of the double level step-in arrangement) while the lower interiormost edges of lower step-ins Q1 to Q3 extend in closer relative to the heater units horizontal portion 140. For example, dimensions DI, DJ and DK illustrate some of the relative spacing between heater bar 140 and the interior surfaces of the step-ins. For example, DI shows the relative spacing between the straight edge of step-in Q1 and the tangential, closest surface of heater bar 134 (by way of transverse line DI) as being intermediate the smaller spacing distance DK and the larger spacing DJ (with the same spacing DI being true for step-in Q2). The smallest spacing DK is between a line extending transverse to the tangential, closest spaced line extending of the closest point of the heater unit adjacent thereto. DJ illustrates the transverse distance between the inner surface immediately below the annular step in 202 and a tangential line of the heater bar portion closest thereto. The annular thickness or radial depth of step-in 202 is preferably about 0.25 to 1 inch with 0.5 inch being preferred.

Block BL, into which the main housing 126 of the heater unit is slid by way of grooves GR1 and GR2, is illustrated in its mounted position on the exterior side of the shell 22. Also the electrical connection extending from the housing 126 of the heater unit is preferably of a design that precludes too easy detachment (a problem associated with some prior art designs relying on magnetic attachment). To facilitate rapid and secure connection the present invention preferably includes a first electrical connector 204 (FIG. 4B) extending from a relatively short "pig tail" wire 206 which is free to rotate at the housing 126 connection. The connector end 208 is preferably a female receptor with internal male prongs 209 similar to the main power connection to a personal computer and with receptor end 210 being the insertable male component into the connector end while having female receptors 211. This connection used in the present setting provides for sufficient attachment without undesirable detachment.

Figure 16:
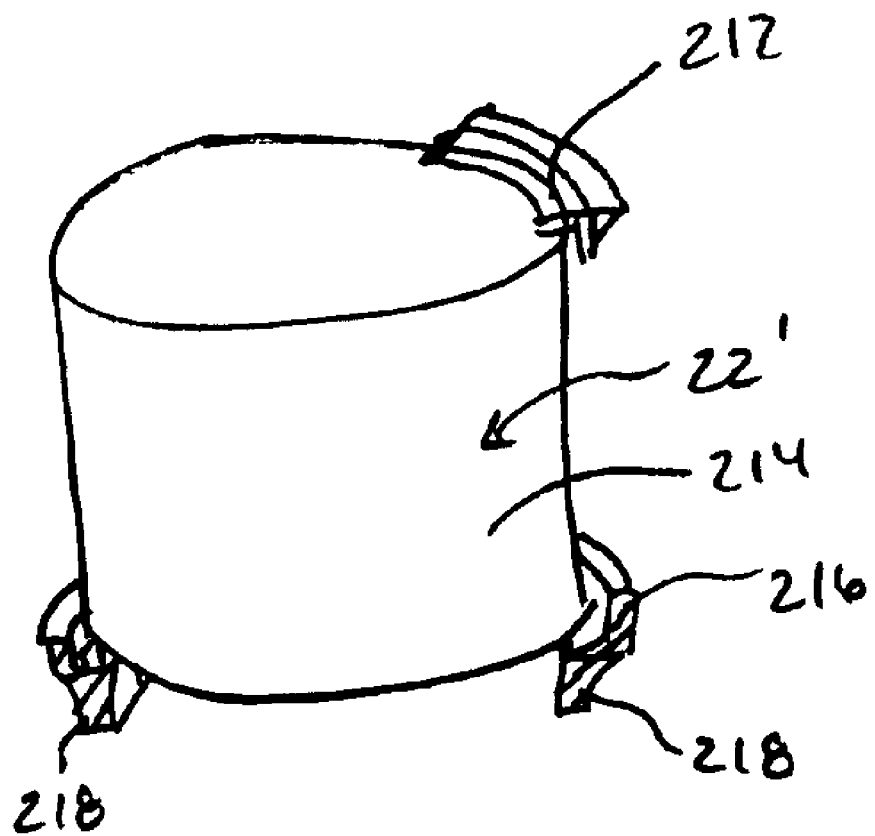
FIG. 16 shows an exploded view of an alternate multi-member embodiment of the shell of the present invention.
Figure 17:
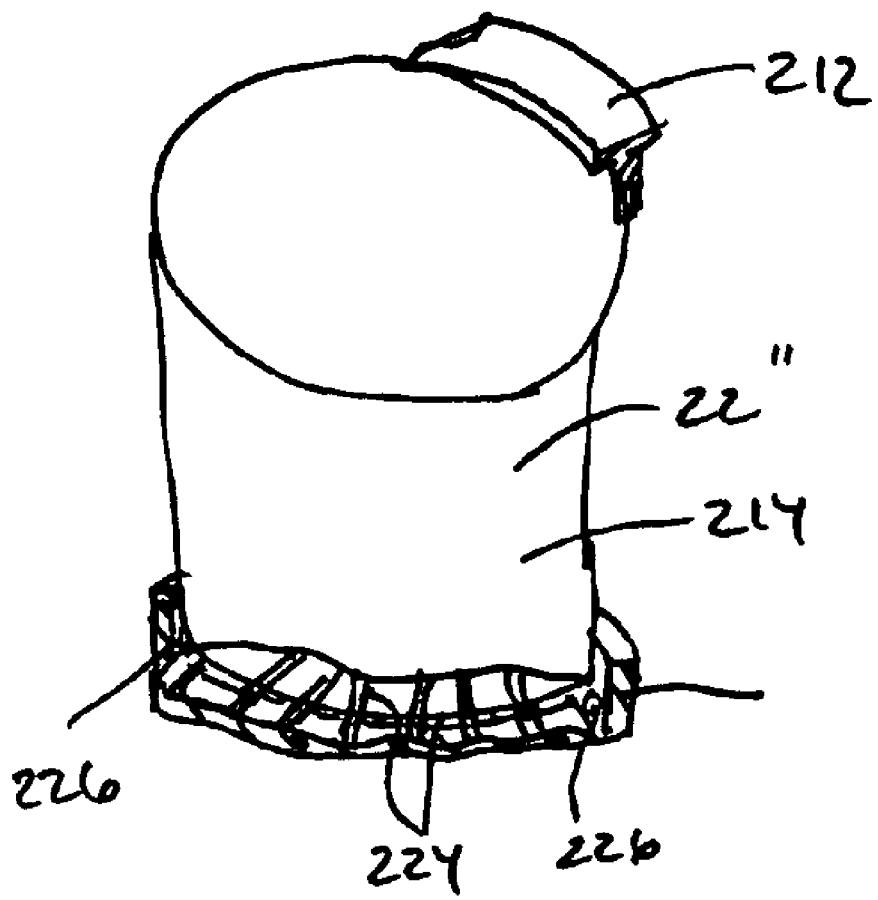
FIG. 17 shows an exploded view of an additional alternate multi-member embodiment of the shell of the present invention.

FIGS. 16 and 17 show exploded views of alternate shell embodiments of the present invention, with FIG. 16 showing shell 22' being formed of a combination upper ring 212 (preferably plastic formed by injection molding and shown in cut-away in FIG. 16) providing the contact bead or flange on which the cooking pot rests, intermediate shell wall 214 (e.g. a fastened coil of material as in aluminum or a monolithic cylinder of the same) and a bottom ring 216 (shown in cut away) featuring a bottom contact portion with vertically extending flange for receiving and positioning the lower edge of shell wall and a plurality of integral legs 218 (e.g., monolithic body such as one injection molded at the same time as forming the ring) extending down from the reception portion of the bottom ring 216. The upper and lower rings are securely fastened to respective upper and lower ends of the shell wall (e.g., mechanical fastening via added fastening members or a mechanical interrelationship between the two such as in an overmolding process with catch tabs.

FIG. 17 shows a similar view as that of FIG. 16 except that rather than a lower ring 216 there is provided a lower cup member 220 having a continuous surface wall 222 for contact with the bottom of the cooking pot (preferably with a series of grooves and ribs 224 as well as ventilation ports for heat reduction in the contact area of the cooking pot (thus a high temperature plastic is preferably used) or a combination of plastic base and an upper high temperature intermediate laminate (not shown) between the base and the cooking pot to be inserted into the shell.

What is claimed is:

1. A domestic fryer assembly, comprising:

a shell having an interior cavity;

a cooking pot dimensioned for receipt within said interior cavity;

a heat source positioned for heating a cooking fluid within said pot; and said pot being dimensioned to receive in cooking position a 12 pound turkey, wherein said shell includes a recessed section in an upper rim region of said shell and said cooking pot includes a recessed section received within the recessed section of said shell, and wherein said heat source comprises an electric resistance element that extends within the recessed section of said shell, and further comprising a lid which is arranged for flush contact with an upper edge of said cooking pot and with the electric resistance element positioned below the lid so as to avoid interruption of the flush contact of the lid with the upper edge of the cooking pot.

2. The assembly of claim 1 wherein said cooking pot includes a radial step-in section that is positioned in a lower third of said cooking pot.

3. The assembly of claim 2 wherein said heat source is a resistance bar having a first section that extends down into the pot and a second section that is suspended above a bottom surface of said cooking pot.

4. The assembly of claim 3 wherein said step-in section is positioned above said second section of said resistance bar.

5. The assembly of claim 4 wherein said step-in section of said cooking pot includes a plurality of step-in segments spaced peripherally about the side wall of said cooking pot.

6. The assembly of claim 5 further comprising food holding means having a radial outer region dimensioned for support by said step-in section of said cooking pot.

7. The assembly of claim 6 wherein said food holding means comprises a basket having cooking fluid flow through apertures and grasping means.

8. The assembly of claim 1 further comprising food holding means dimensioned for receiving the 12 pound turkey, and means for supporting said food holding means in a suspended state above a section of said heat source extending along a bottom surface of said cooking pot.

9. The apparatus of claim 8 wherein said means for supporting includes a first step-in section formed in said cooking pot.

10. The assembly of claim 1 further comprising food holding means and wherein said resistance element includes a portion extending down into said cooking pot and wherein said food holding means is dimensioned for receipt within said cooking pot and includes a recessed side wall portion that extends in common with the downwardly extending portion of the resistance element.

11. The assembly of claim 1 wherein said cooking pot includes a cooking fluid fill line representing a cooking fluid volume from 8 to 16 quarts.

12. The assembly of claim 11 wherein said cooking pot has an overall volume of about 2 to 3 times that represented by the fluid fill line.

13. The assembly of claim 1 wherein said shell is a multicomponent unit with a first component including an upper annular rim of plastic, an intermediate metallic shell wall and a lower base support with suspension projections extending thereoff.

14. The assembly of claim 1 wherein said resistance element is placed within said pot for direct contact with a heating fluid received within said pot.

15. The assembly of claim 10 wherein said food holding means includes a basket and the recessed portion includes a vertically and radially inward extending recess formed in a sidewall of said basket.

16. The assembly of claim 1 wherein said heat source includes a control unit and said resistance element with both the control unit and said resistance element being hand removable from an attachment state with said shell.

17. The assembly of claim 1 wherein said heat source includes a heating resistance bar that extends through a wall section of said shell and, in use, extends into direct contact with the cooking fluid.

18. A domestic fryer assembly, comprising:

a shell having an interior cavity;

a cooking pot dimensioned for receipt within said interior cavity with said pot being dimensioned to receive in cooking position a 12 pound turkey;

a heat source positioned for heating a cooking fluid within said pot; and food holding means dimensioned for receiving the 12 pound turkey; and means for supporting said food holding means in a suspended state above a section of said heat source extending along a bottom surface of said cooking pot, wherein said means for supporting includes a first step-in section formed in said cooking pot, and wherein said cooking pot includes a second radial step-in section and said second radial step-in section is positioned above said first radial step-in section and is radially outward of said first step-in section.

19. A domestic fryer assembly, comprising:

a shell having an interior cavity;

a cooking pot dimensioned for receipt within said interior cavity; and a heat source positioned for heating a cooking fluid within said pot, wherein said heat source includes a resistance bar that extends down into a fluid reception cavity of said pot, but does not extend above an upper rim of the shell and cooking pot, wherein said resistance bar has an upper portion that extends below the upper rim of said shell and cooking pot in extending from an external-to-shell position to an internal-to-shell position, and wherein the upper portion of said resistance bar extends within a notched region in an upper region of said shell.

20. The assembly of claim 19 wherein said cooking pot includes a radial step-in section that is positioned in a lower third of said cooking pot.

21. The assembly of claim 20 wherein said resistance bar has a first section that extends down into the pot and a second section that is suspended above a bottom surface of said cooking pot.

22. The assembly of claim 21 wherein said step-in section is positioned above said second section of said resistance bar.

23. The assembly of claim 19 wherein said heat source comprises a bridge bracket which is secured to said upper portion of said resistance bar and extends across the notched region of said shell which is open topped.

24. The assembly of claim 23 wherein said cooking pot includes a radial projection received within the notched region in said shell.

25. A domestic fryer assembly, comprising:

a shell having an interior cavity;

a cooking pot dimensioned for receipt within said interior cavity, a heat source positioned for heating a cooking fluid within said pot, wherein said heat source includes a resistance bar that extends down into a fluid reception cavity of said pot, but does not extend above an upper rim of the shell and cooking pot, wherein said resistance bar has an upper portion that extends below the upper rim of said shell and cooking pot in extending from an external-to-shell position to an internal-to-shell position, and wherein the upper portion of said resistance bar extends within a notched region in an upper region of said shell; and a lid having a lower surface which is placed in flush contact with the upper rim of said cooking pot and said heat resistance bar extends radially from an external-to-shell location to an internal-to-shell location under said lid while said lid is in flush contact with said cooking pot.

26. A domestic fryer assembly, comprising:

a shell having an interior cavity;

a cooking pot dimensioned for receipt within said interior cavity;

a heat source positioned for heating a cooking fluid within said pot; and a temperature sensor, wherein said heat source includes a resistance bar having a first section that extends down into the pot and a second section that is suspended above a bottom surface of said cooking pot, and said temperature sensor is attached to said second section, wherein said cooking pot includes an upper edge flange that is placed in contact with an upper rim of said shell, and the upper edge flange includes a recessed region that extends into a notch in the upper rim of said shell, and wherein said heat source includes a third resistance bar section that extends through the notch in the upper rim of said shell.

27. The assembly of claim 26 wherein said cooking pot includes a radial step-in section that is positioned in a lower third of said cooking pot.

28. The assembly of claim 26 further comprising food holding means for holding a 12 pound turkey, and means for supporting said food holding means in a suspended state above the second section of said resistance bar.

29. A domestic fryer assembly, comprising:

a shell having an interior cavity;

a cooking pot dimensioned for receipt within said interior cavity and dimensioned to receive in cooking position a 12 pound turkey;

a heat source positioned for heating a cooking fluid within said pot;

a basket suited for holding the 12 lb. turkey and said basket having a handle which is pivotable from a recessed position to a grasping position and said handle has a grasp area centered above the pot opening when in a grasping position.

30. The assembly of claim 29 wherein said shell and cooking pot have circular cross-sections, and said shell includes receiving means for receiving said cooking pot to preclude free relative rotation of said cooking pot relative to said shell.

31. The assembly of claim 30 wherein said receiving means includes a notch formed in an upper edge of said shell that is dimensioned to receive a projecting portion of said pot.

32. The assembly of claim 31 wherein said projecting portion includes a radially projecting recessed tab portion designed to extend into the notch.

* * * * *